United States Patent
Zhang

(10) Patent No.: US 9,565,247 B2
(45) Date of Patent: Feb. 7, 2017

(54) METHOD AND SYSTEM OF SHARING INFORMATION IN A SOCIAL NETWORKING APPLICATION

(71) Applicant: Tencent Technology (Shenzhen) Company Limited, Shenzhen (CN)

(72) Inventor: Lei Zhang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/188,888

(22) Filed: Jun. 21, 2016

(65) Prior Publication Data

US 2016/0301743 A1 Oct. 13, 2016

Related U.S. Application Data

(63) Continuation of application No. PCT/CN2014/090295, filed on Nov. 5, 2014.

(30) Foreign Application Priority Data

Apr. 17, 2014 (CN) .......................... 2014 1 0154999

(51) Int. Cl.
*H04L 29/08* (2006.01)
*G06Q 50/00* (2012.01)

(52) U.S. Cl.
CPC ............... *H04L 67/10* (2013.01); *G06Q 50/01* (2013.01); *H04L 67/141* (2013.01)

(58) Field of Classification Search
None
See application file for complete search history.

(56) References Cited

FOREIGN PATENT DOCUMENTS

| CN | 103581266 A | 2/2014 |
|---|---|---|
| WO | WO 2009074037 A1 | 6/2009 |

OTHER PUBLICATIONS

Tencent Technology, ISRWO, PCT/CN2014/090295, Feb. 10, 2015, 7 pgs.
Tencent Technology, IPRP, PCT/CN2014/090295, Oct. 18, 2016, 5 pgs.

*Primary Examiner* — Azizul Choudhury
(74) *Attorney, Agent, or Firm* — Morgan, Lewis & Bockius LLP

(57) ABSTRACT

A method of sharing information in a social networking application includes at a computer server having one or more processors and memory storing programs configured for execution by the one or more processors, receiving a binding request from a first user to bind with at least a second user of a social networking application, the second user being a friend of the first user; generating a binding relationship between the first user and the second user; storing the binding relationship between the first user and the second user at the computer server; receiving information from the first user to be shared in a binding manner with the second user; retrieving a friend list of the second user; and sharing the information from the first user with at least one friend of the second user.

18 Claims, 21 Drawing Sheets

| Server | | | | |
|---|---|---|---|---|
| Buddy list of user B | | | | |
| A | B1 | B2 | B3 | B4 |

FIG. 6a

| Server | | | | |
|---|---|---|---|---|
| Buddy list of user A | | | | |
| B | C | A1 | A2 | A3 |

FIG. 6b

METHOD AND SYSTEM OF SHARING INFORMATION IN A SOCIAL NETWORKING APPLICATION

RELATED APPLICATIONS

This application is a continuation application of PCT Patent Application No. PCT/CN2014/090295, entitled "METHOD AND SYSTEM OF SHARING INFORMATION IN A SOCIAL NETWORKING APPLICATION" filed on Nov. 5, 2014, which claims priority to Chinese Patent Application No. 201410154999.5, "METHOD AND SYSTEM OF SHARING INFORMATION IN A SOCIAL NETWORKING APPLICATION," filed on Apr. 17, 2014, both of which are hereby incorporated by reference in their entirety.

TECHNICAL FIELD

The present application relates to mobile internet application technologies, and in particular, to a method and system of sharing information in a social networking application.

BACKGROUND

Social networking applications are becoming the most popular applications installed in mobile terminals, such as smartphones, tablet computers, ebook readers, or palm computers. A social networking application may be an instant messaging application, an instant voice application, a microblog application, a dating community application, or the like.

These social networking applications, in general, provide a function of sharing information. For example, after user A shares a piece of information, all or a partial of friends of user A can receive the shared information, where all or the partial of friends refer to those who have permission to view information shared by user A, or those who follow user A, or the like. In current social networking applications, user A needs to manually forward the acquired information. A friend of user A then acquires the information through a sharing platform of a social networking application, and determines whether to further forward the information shared by user A. If the friend of user A determines to further forward the information, the friend needs to select content to be forwarded, and manually edit and forward the content. In such a process, different users need to make individual decisions as to whether to share the viewed information further with other people, and thus, information propagation is relatively slow.

The present application provides a method of binding the first user and at least the second user. Therefore, information sent from the first user can be shared automatically with the friends of the second user and the second user as well. The second user does not need to manually select the friends to share the information sent from the first user, and therefore, information can be shared faster and more efficiently in the users of the social networking application. Further, as the friends to be shared are bound users, the present application can provide secure and complete sharing among the bound users.

SUMMARY

According to some embodiments of the present application, a method of sharing information in a social networking application comprises at a computer server having one or more processors and memory storing programs configured for execution by the one or more processors, receiving a binding request from a first user to bind with at least a second user of a social networking application, the second user being on a friend list of the first user; generating a binding relationship between the first user and the second user; storing the binding relationship between the first user and the second user at the computer server; receiving information from the first user to be shared in a binding manner with the second user; retrieving a friend list of the second user; and sharing the information from the first user with at least one friend on the friends list of the second user.

In some embodiments, the step of generating a binding relationship between the first user and the second user further comprises forwarding the binding request to the second user, receiving a binding response from the second user; determining from the binding response whether the second user agrees to be bound with the first user; and if the second user agrees to be bound with the first user, generating the binding relationship between the first user and the second user.

In some embodiments, the step of generating a binding relationship between the first user and the second user further comprises determining whether a friendship between the first user and the second user satisfies a binding condition; and if the friendship between the first user and the second user satisfies the binding condition, generating a binding relationship between the first user and the second user.

In some embodiments, the method of sharing information in a social networking application further comprises receiving a release request from the first user to release the binding relationship from the second user; and releasing the binding relationship between the first user and the second user.

In some embodiments, the method of sharing information in a social networking application further comprises determining whether a friendship between the first user and the second user satisfies a release condition; and if the friendship between the first user and the second user satisfies the release condition, releasing the binding relationship between the first user and the second user.

In some embodiments, the information from the first user to be shared in the binding manner is originally published by the first user.

In some embodiments, the information from the first user to be shared in the binding manner is forwarded from a preset information source.

In some embodiments, the method of sharing information in a social networking application further comprises adding an identifier to the information from the first user to be shared in the binding manner, wherein when the information from the first user is shared with at least one friend of the second user, the identifier is configured to display a first tag on an interface of the first user, indicating that the information has been shared with friends; a second tag on an interface of the second user, indicating that the information is shared by a friend, and a third tag on an interface of the at least one friend of the second user, indicating that the information is shared by a friend in the binding manner.

According to another embodiment of the present application, a method of sharing information in a social networking application comprises at a computer client of a first user having one or more processors and memory storing programs executed by the one or more processors, sending a binding request to a second user via a computer server, the second user being on a friend list of the first user; receiving a binding response from the second user via the computer server; acquiring information to be shared in a binding manner; forwarding the information to be shared in the binding manner to the second user via the computer server; and sending a release request to second user via the computer server to release a binding relationship.

According to another embodiment of the present application, a method of sharing information in a social networking application comprises at a computer client of a second user having one or more processors and memory storing one or more programs configured for execution by the one or more processors, receiving a binding request from a first user via the computer server, the second user being on a friend list of the first user; sending a binding response to the first user via the computer server; receiving information to be shared in a binding manner from the first user via the computer server; sharing the information to at least one friend on the friend list of the second user; and receiving a release request from the first user via the computer server to release a binding relationship.

According to some embodiments of the present application, a system of sharing information in a social networking application, comprises one or more processors; memory; and one or more programs stored in the memory and configured for execution by the one or more processors of a computer server, the one or more programs including instructions for: receiving a binding request from a first user to bind with at least a second user of a social networking application, the second user being a friend of the first user; generating a binding relationship between the first user and the second user; storing the binding relationship between the first user and the second user at the computer server; receiving information from the first user to be shared in a binding manner with the second user; retrieving a friend list of the second user; and sharing the information from the first user with at least one friend of the second user.

According to some embodiments of the present application, a system of sharing information in a social networking application comprises a computer client of a first user having one or more processors and memory storing one or more programs configured for execution by the one or more processors, the one or more programs including instructions for: sending a binding request to a second user via a computer server, the second user being on a friend list of the first user; receiving the binding response from the second user via the computer server; acquiring information to be shared in a binding manner; forwarding the information to be shared in the binding manner to the second user via the computer server; and sending a release request to second user via the computer server to release a binding relationship between the first user and the second user.

According to some embodiments of the present application, a system of sharing information in a social networking application comprises a computer client of a second user having one or more processors and memory storing one or more programs configured for execution by the one or more processors, the one or more programs including instructions for: receiving a binding request from a first user via a computer server, the second user being on a friend list of the first user; sending a binding response to the first user via the computer server; receiving information to be shared in a binding manner from the first user via the computer server; sharing the information to at least one friend on the friend list of the second user; and receiving a release request from the first user via the computer server to release a binding relationship between the first user and the second user.

According to some embodiments of the present application, a non-transitory computer readable storage medium of a system of sharing information in a social networking application, stores one or more programs for execution by one or more processors of a computer server including instructions for: receiving a binding request from a first user to bind with at least a second user of a social networking application, the second user being a friend of the first user; generating a binding relationship between the first user and the second user; storing the binding relationship between the first user and the second user at the computer server; receiving information from the first user to be shared in a binding manner with the second user; retrieving a friend list of the second user; and sharing the information from the first user with at least one friend of the second user.

In some embodiments, the non-transitory computer readable storage medium of a system of sharing information in a social networking application further stores one or more programs for execution by one or more processors of a computer client of the first user including instructions for: sending the binding request to the second user via the computer server; receiving the binding response from the second user via the computer server; acquiring the information to be shared in the binding manner; forwarding the information to be shared in the binding manner to the second user via the computer server; and sending the release request to second user via the computer server to release the binding relationship.

In some embodiments, the non-transitory computer readable storage medium of a system of sharing information in a social networking application further stores one or more programs for execution by one or more processors of a computer client of the second user including instructions for: receiving the binding request from the first user via the computer server; sending the binding response to the first user via the computer server; receiving the information to be shared in the binding manner from the first user via the computer server; sharing the information to at least one friend of the second user; and receiving the release request from the first user via the computer server to release the binding relationship.

BRIEF DESCRIPTION OF THE DRAWINGS

The aforementioned features and advantages of the present application as well as additional features and advantages thereof will be more clearly understood hereinafter as a result of a detailed description of preferred embodiments when taken in conjunction with the drawings.

To describe the technical solutions in the embodiments of the present application more clearly, the following briefly introduces the accompanying drawings required for describing the embodiments. Apparently, the accompanying drawings in the following description show some embodiments of the present application, and those of ordinary skill in the art may still derive other drawings from these accompanying drawings without creative efforts.

FIG. 6a is a schematic diagram of acquiring a friend list of a second user according to some other embodiment of the present application;

FIG. 6b is a schematic diagram of acquiring a friend list of a first user according to some other embodiment of the present application;

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

To make the objectives, technical solutions, and advantages of the present application clearer, the following further describes the embodiments of the present application in detail with reference to the accompanying drawings.

Figure 1:
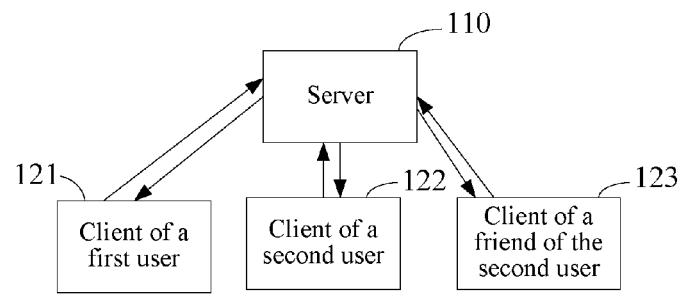
FIG. 1 is a schematic structural diagram of an implementation environment involved in an information sharing method according to some embodiment of the present application.

FIG. 1 is a schematic structural diagram of an implementation environment involved in an information sharing method according to some embodiment of the present application. The implementation environment may include a computer server 110, a computer client 121 of a first user, a computer client 122 of at least one second user, and a computer client 123 of a friend of the at least one second user.

The computer server 110 may be a server, or a server cluster formed by several servers, or a cloud computing service center. The server 110 may be configured to provide a social application service for a client.

The computer client 121 of the first user, the computer client 122 of the second user, and the computer client 123 of the friend of the second user may be client terminals installed with the social networking application, for example, a mobile phone, a tablet computer, an ebook reader, a Moving Picture Experts Group Audio Layer 3 (MP3) player, a Moving Picture Experts Group Audio Layer 4 (MP4) player, a laptop portable computer, a desktop computer, and the like.

The computer client 121 of the first user, the computer client 122 of the second user, and the computer client 123 of the friend of the second user may be connected to the computer server 110 through a wireless network, a wired network, or a combination.

Figure 2:
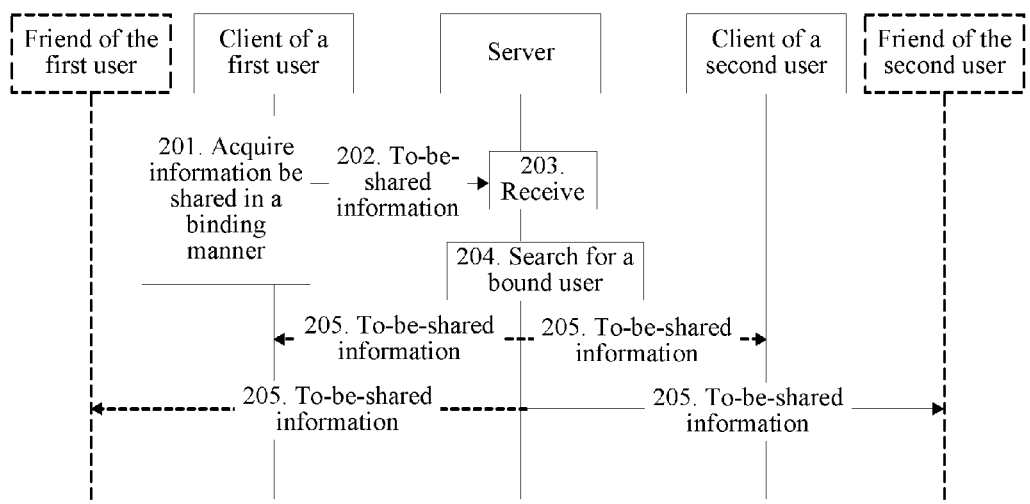
FIG. 2 is a method flowchart of an information sharing method according to some other embodiment of the present application.

FIG. 2 is a flowchart of an information sharing method according to some embodiment of the present application. The information sharing method is applied to the implementation environment shown in FIG. 1. The method may include the steps discussed below.

At step 201, a computer client of a first user acquires the information to be shared in a binding manner.

At step 202, the computer client of the first user sends the information to be shared in a binding manner to a computer server.

At step 203, the computer server receives the information to be shared in the binding manner from the first user.

At step 204, the computer server searches for at least one second user that is bound to the first user.

In some embodiments, the computer server retrieves the at least one second user that is bound to the first user, and the second user also is a friend of the first user.

At step 205, the computer server shares the information in the binding manner with at least a friend of the second user.

According to the present application, by binding the first user and at least the second user, information sent from the first user can be shared automatically with the friends of the second user and the second user as well. The second user does not need to manually select the friends to share the information sent from the first user, and therefore, information can be shared faster and more efficiently in the users of the social networking application. Further, as the friends to be shared are bound users, the present application can provide secure and complete sharing among the bound users.

Figure 3:
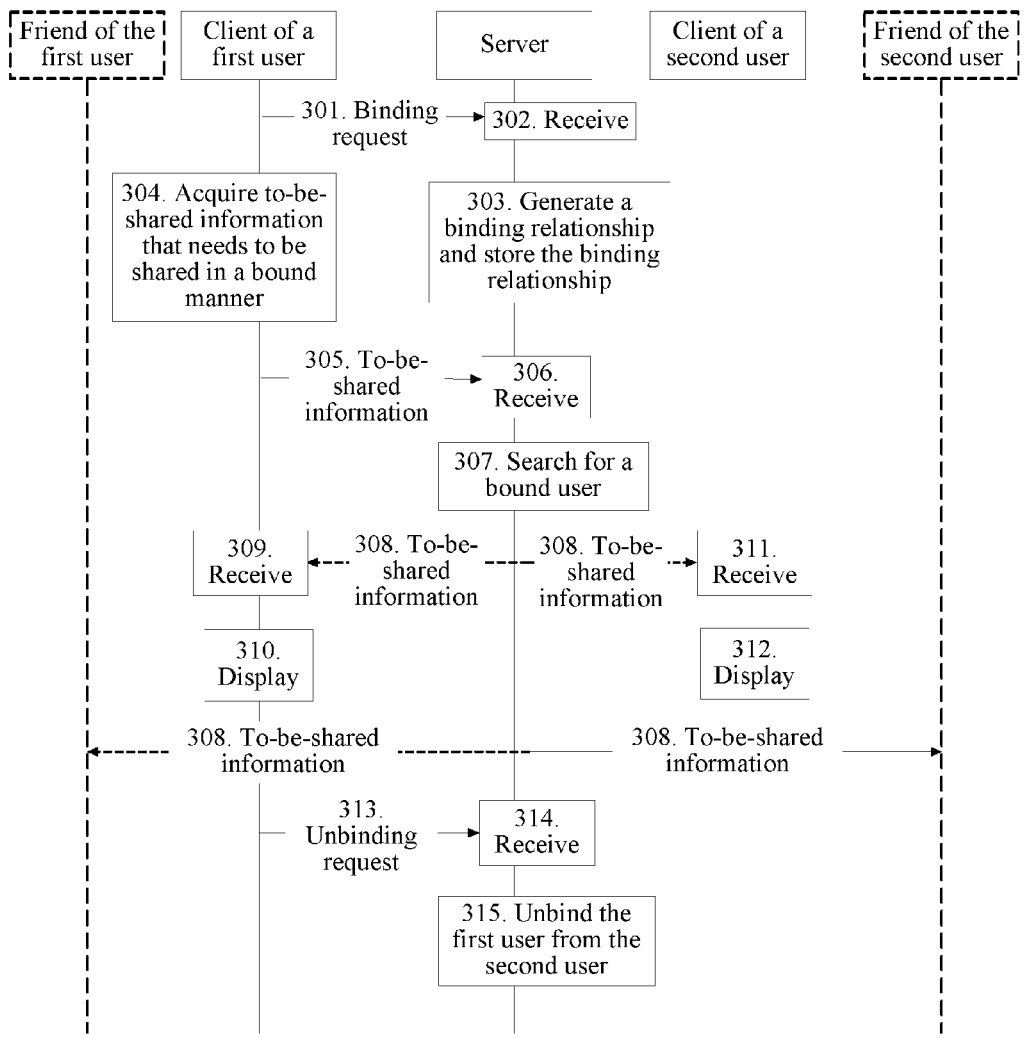
FIG. 3 is a method flowchart of an information sharing method according to some other embodiment of the present application.

FIG. 3 is a method flowchart of an information sharing method according to another embodiment of the present application. The information sharing method may include the steps discussed below.

At step 301, a computer client of a first user sends a binding request to a second user via a computer server.

In some embodiments, the first user may select a second user that needs to be bound to from the friends list, and send a binding request to the selected second user via the computer server.

At step 302, the computer server receives the binding request sent from the first user.

At step 303, the computer server generates a binding relationship between the first user and the second user, and stores the binding relationship in the computer server.

According to the present application, the client terminal of the first user and the client terminal of the second user may be bound via the computer server. When the information is sent from the first user to be shared in a binding manner, the computer server may search for bound users, and automatically forward the information to the bound users and the friends of the bound users.

At step 304, the computer client of the first user acquires information to be shared in a binding manner.

At step 305, the computer client of the first user sends the information to be shared to the computer server.

At step 306, the computer server receives the information to be shared from the first user.

At step 307, the computer server searches for at least one second user bound to the first user.

At step 308, the computer server shares the information in a binding manner with a friend of the at least one second user.

At step 309, the computer client of the first user receives the information to be shared in a binding manner from the computer server.

At step 310, the computer client of the first user displays the information respectively based on the attribute of the information, i.e., whether it is a type of binding-sharing information or general sharing information.

At step 311, the computer client of the second user receives the information to be shared in a binding manner.

In some embodiments, the information to be shared in a binding manner sent from the first user may be shared with friends of the first user, at least one bound user, i.e., the second user, and friends of the second user.

In some embodiments, the computer server may add an identifier to the information from the first user to be shared in the binding manner. When the information from the first user is shared with at least one friend of the second user, the identifier may be configured to display (1) a first tag on an interface of the first user, indicating that the information has been shared with friends; (2) a second tag on an interface of the second user, indicating that the information is shared by a friend, and (3) a third tag on an interface of the at least one friend of the second user, indicating that the information is shared by a friend in the binding manner.

At step 312, the computer client of the second user displays the information to be shared in a binding manner.

At step 313, the computer client of the first user sends a release request to the computer server to release the binding relationship from the second user.

At step 314, the computer server receives the release request from the first user.

At step 315, the computer server releases the binding relationship between the first user and the second user.

According to the present application, as the second user is bound to the first user, friends of the second user may also receive the information to be shared in a binding manner from the computer server automatically.

In some embodiments, the information to be shared in a binding manner may be originally published by the first user. Yet in some other embodiments, the information to be shared in a binding manner may be forwarded from a preset information source.

Figure 4:
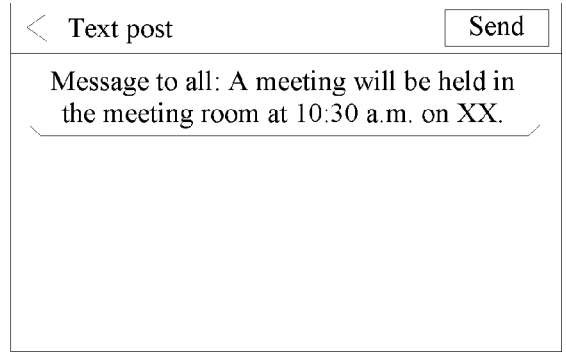
FIG. 4 is an effect diagram of information editing according to some other embodiment of the present application.

FIG. 4 is an effect diagram of information editing according to the embodiment when the information to be shared in a binding manner may be originally published by the first user. The information to be shared in a binding manner may be a piece of information edited by the first user, and the content to be shared includes at least notification, public welfare information, common encyclopedic knowledge, or a game designed according to the interest of the first user and requires multiple participants. As shown in FIG. 4, the first user may edit a piece of information that "Note: a meeting will be held in the meeting room at 10:30 a.m. on XX."

Figure 5:
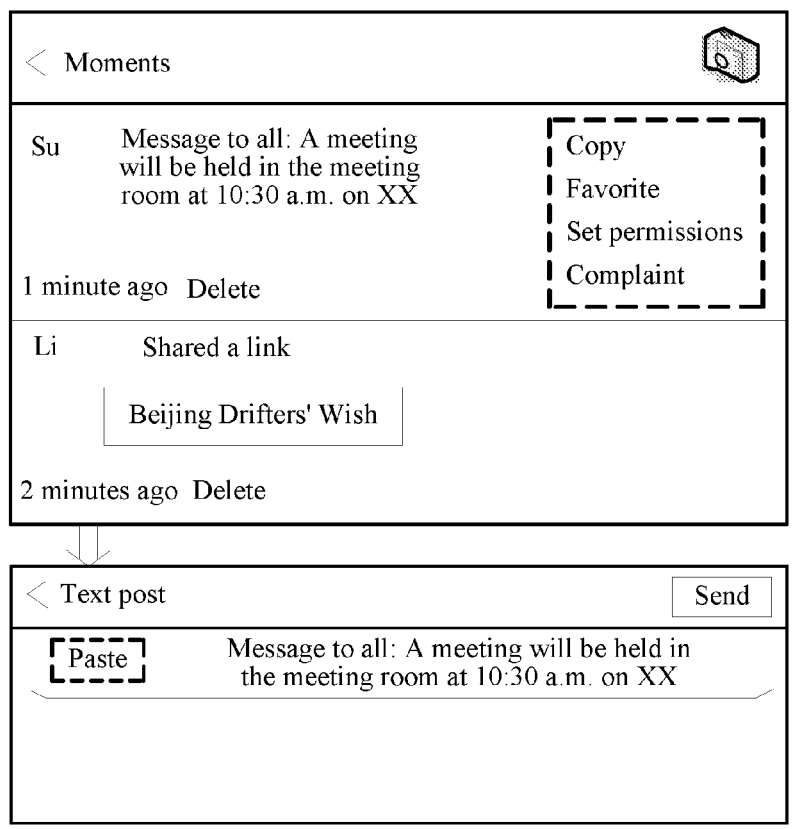
FIG. 5 is an effect diagram of information editing according to some other embodiment of the present application.

FIG. 5 is an effect diagram of information editing according to the embodiment when the information to be shared in a binding manner may be forwarded from a preset information source. The information forwarded from the preset information source may be acquired by the first user through a social platform in a social application. Such information is not originated by the first user. However, the contents to be shared may be the same as that in FIG. 4. As shown in FIG. 5, the first user copies information shared by a user named "Su" that "Note: a meeting will be held in the meeting room at 10:30 a.m. on XX," and pastes the information to be shared to an editing page of the first user.

FIG. 6a is a friend list of a second user retrieved by a computer server. As shown in FIG. 6a, the second user, i.e., user B has a friend list of A, B1, B2, B3, and B4.

FIG. 6b is a friend list of a first user retrieved by a computer server. As shown in FIG. 6b, the first user, i.e., user A has a friend list of B, C, A1, A2, and A3.

Figure 7A:
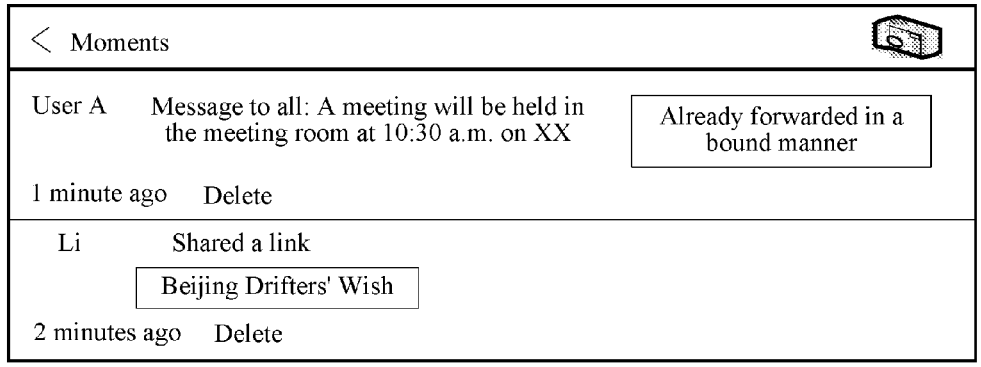
FIG. 7a is a schematic effect diagram of an information sharing method according to some other embodiment of the present application.
Figure 7B:
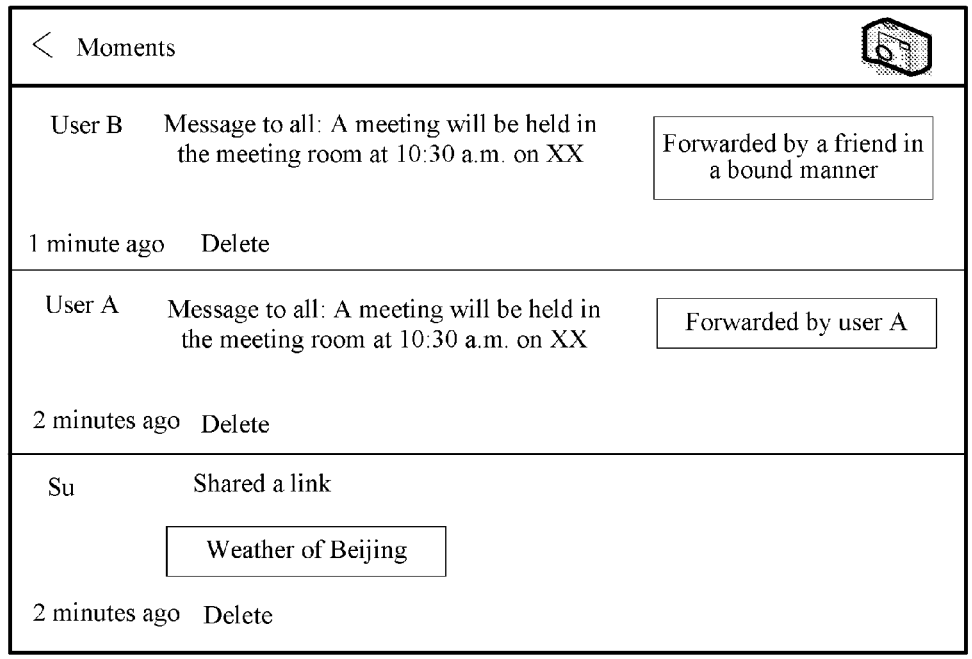
FIG. 7b is a schematic effect diagram of an information sharing method according to some other embodiment of the present application.
Figure 7C:
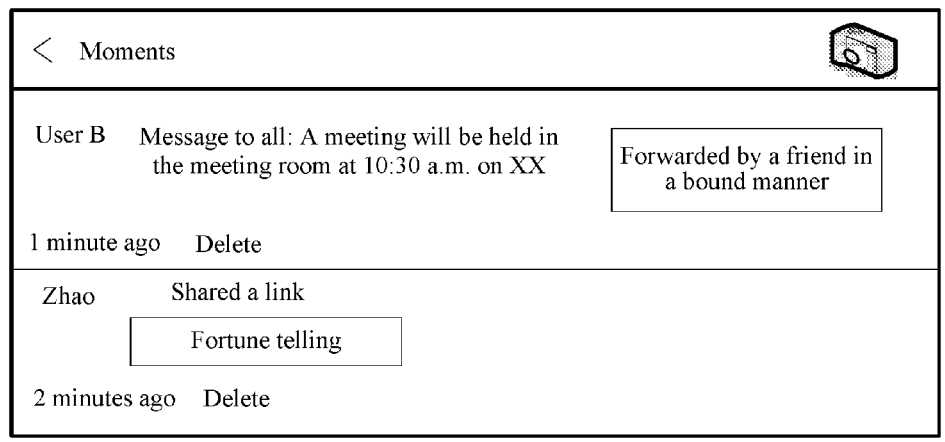
FIG. 7c is a schematic effect diagram of an information sharing method according to some other embodiment of the present application.

Information to be shared in a binding manner displayed on the client terminal of the first, the client terminal of the second user, and the client terminal of the friend of the second user are illustrated on FIG. 7a, FIG. 7b, and FIG. 7c, respectively.

As shown in FIG. 7a, after user A, i.e., the first user shares the information in a binding manner, a client terminal of user A displays an attribute of the information as "already forwarded in a binding manner."

As shown in FIG. 7b, after user A shares the information, a client terminal of user B, i.e., the second user displays an attribute of the information as "forwarded by user A" and in addition, displays an attribute of the information as "forwarded by a friend in a binding manner."

As shown in FIG. 7c, a client terminal of friend B1 of user B displays an attribute of the information as "forwarded by a friend in a binding manner" from user B.

Figure 8:
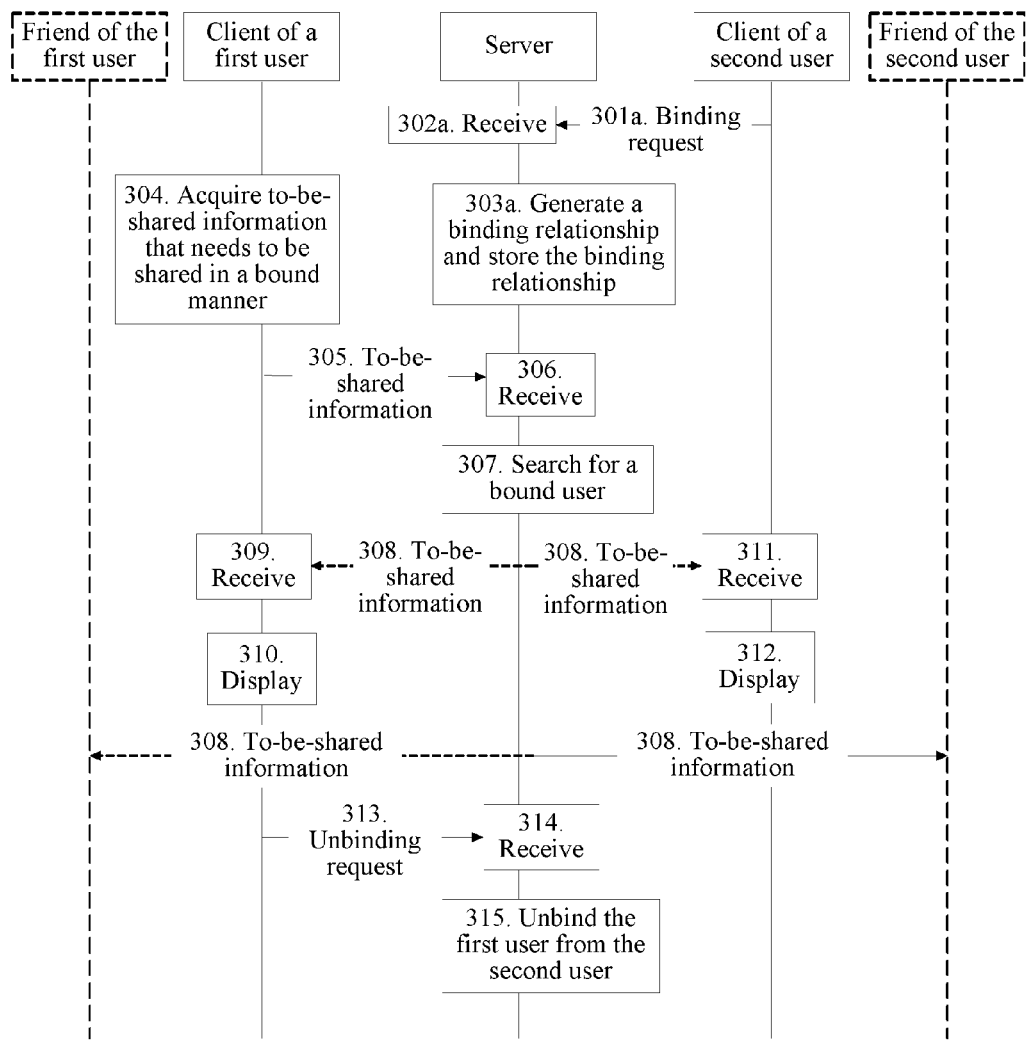
FIG. 8 is a method flowchart of an information sharing method according to some other embodiment of the present application.

FIG. 8 is a method flowchart of an information sharing method according to another embodiment of the present application, where the binding request is initiated by a second user to a first user. The method may include the steps discussed below.

At step 301a, a computer client of a second user sends a binding request to a first user via a computer server.

At step 302a, the computer server receives the binding request from the first user.

At step 303a, the computer server generates a binding relationship between the first user and the second user, and stores the binding relationship.

Steps 304 through 315 are similar to the corresponding steps shown in FIG. 3.

According to the present embodiment, the binding request may be initiated by a second user to a first user, and the computer server may forward the information to be shared in a binding manner to at least one friend of the first user. For example, in a social networking application such as weibo, if a fan wants to forward information published by his/her favorite star, he/she may establish a binding relationship with the favorite star by "following" this star. According to the present application, information published by the favorite star can be shared with friends or fans, and further, with friends of the bound fans automatically, thus, improving the efficiency of information propagation.

Figure 9:
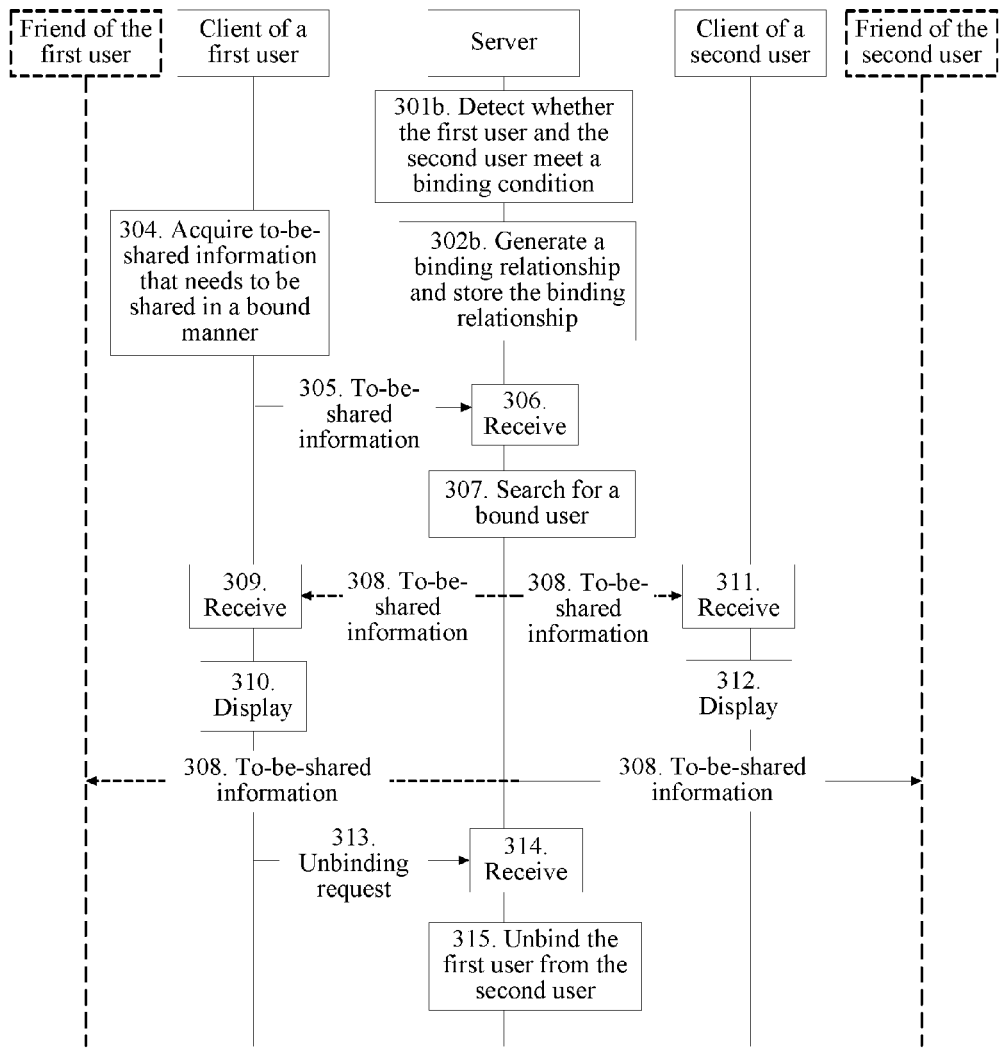
FIG. 9 is a method flowchart of an information sharing method according to yet some other embodiment of the present application.

FIG. 9 is a method flowchart of an information sharing method according to yet another embodiment of the present application. The method includes the steps discussed below.

At step 301b, a computer server determines whether a friendship between a first user and a second user satisfies a binding condition.

At step 302b, if a friendship between a first user and a second user satisfies a binding condition, the computer server generates the binding relationship between the first user and the second user, and stores the binding relationship.

Steps 304 through 315 are similar to the corresponding steps shown in FIG. 3.

In some embodiments, as the first user administrates his/her friends list, the first user may initiate a binding request to bind with a second user, send the binding request to the computer server, and bind with the second user directly via the computer server. The binding of the first user with the second user may not need an approval response from the second user.

According to the present embodiment, the computer server may acquire a relationship between the first user and the second user by searching a friend list of the first user, and determine, according to the relationship, whether a binding condition is satisfied. For example, the server may search for the relationship between the first user and the second user by using at least one of a group list, a discussion group list, and a contact list that are stored in the client terminal of the first user. Further, the server may acquire a type of the relationship between the first user and the second user according to a specific group type of the user, where the group type may be a family group, a colleague group, and a hobby group. For example, in the hobby group, the first user and the second may be bound according to a hot topic which the first user and the second user are interested in.

If the binding condition is satisfied, the server generates the binding relationship between the first user and the second user, and stores the binding relationship so that the first user and the second user do not need to be bound again in subsequent information sharing processes.

Figure 10:
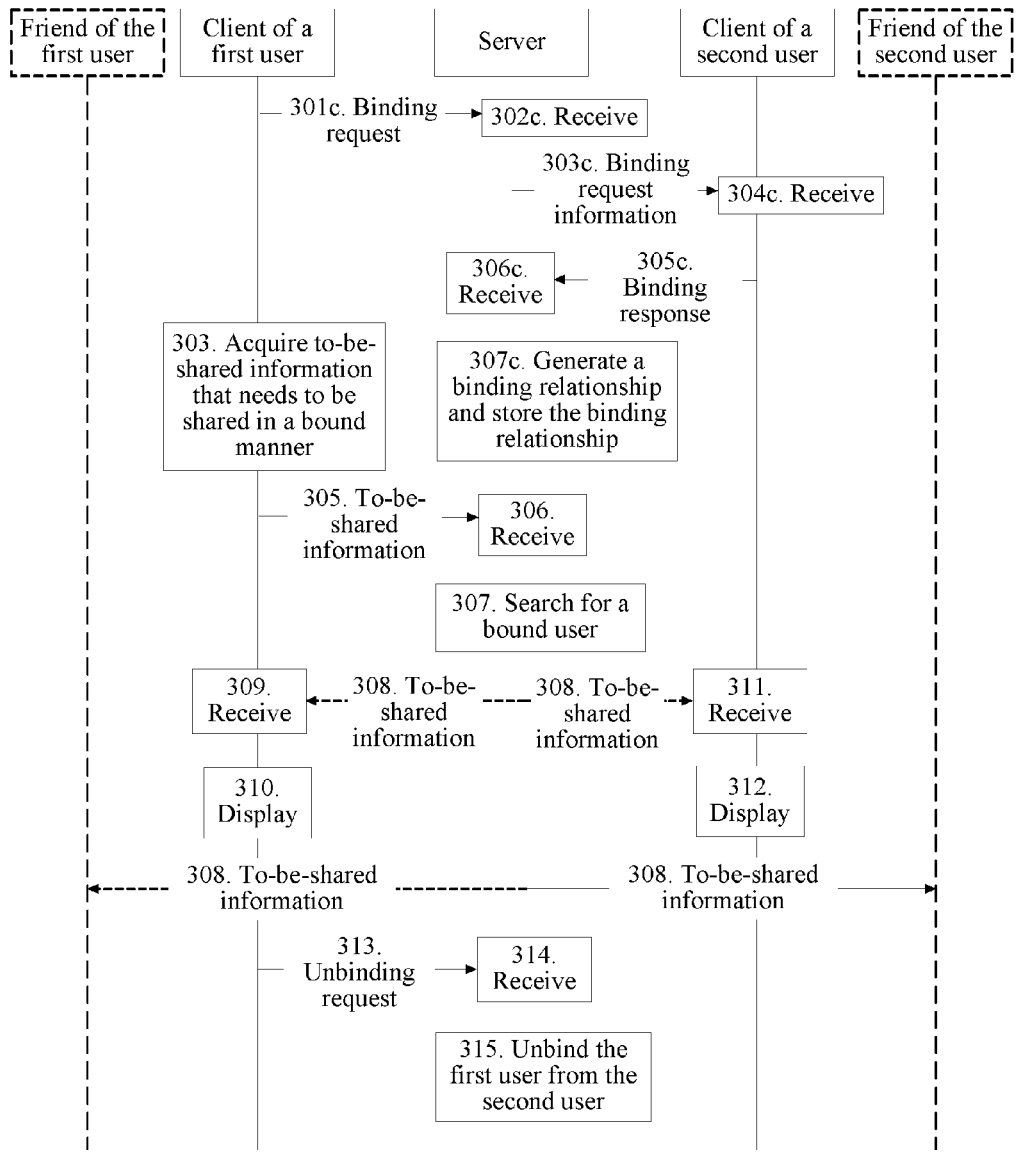
FIG. 10 is a method flowchart of an information sharing method according to yet some other embodiment of the present application.

FIG. 10 is a method flowchart of an information sharing method according to yet another embodiment of the present application. The method may include the steps discussed below.

At step 301c, a computer client of a first user sends a binding request to a second user via a computer server.

At step 302c, the computer server receives the binding request from the first user.

At step 303c, the computer server forwards the binding request to the second user.

At step 304c, the computer client of the second user receives the binding request from the first user via the server.

At step 305c, the computer client of the second user returns a binding response to the server.

At step 306c, the server receives the binding response from the second user.

At step 307c, if the second user agrees to be bound with the first user, the computer server may generate the binding relationship between the first user and the second user, and store the binding relationship.

Steps 306 through 315 are similar to the corresponding steps shown in FIG. 3.

According to the present embodiment, a binding relationship between a first user and a second user is generated if the second user agrees to be bound with the first user.

Figure 11:
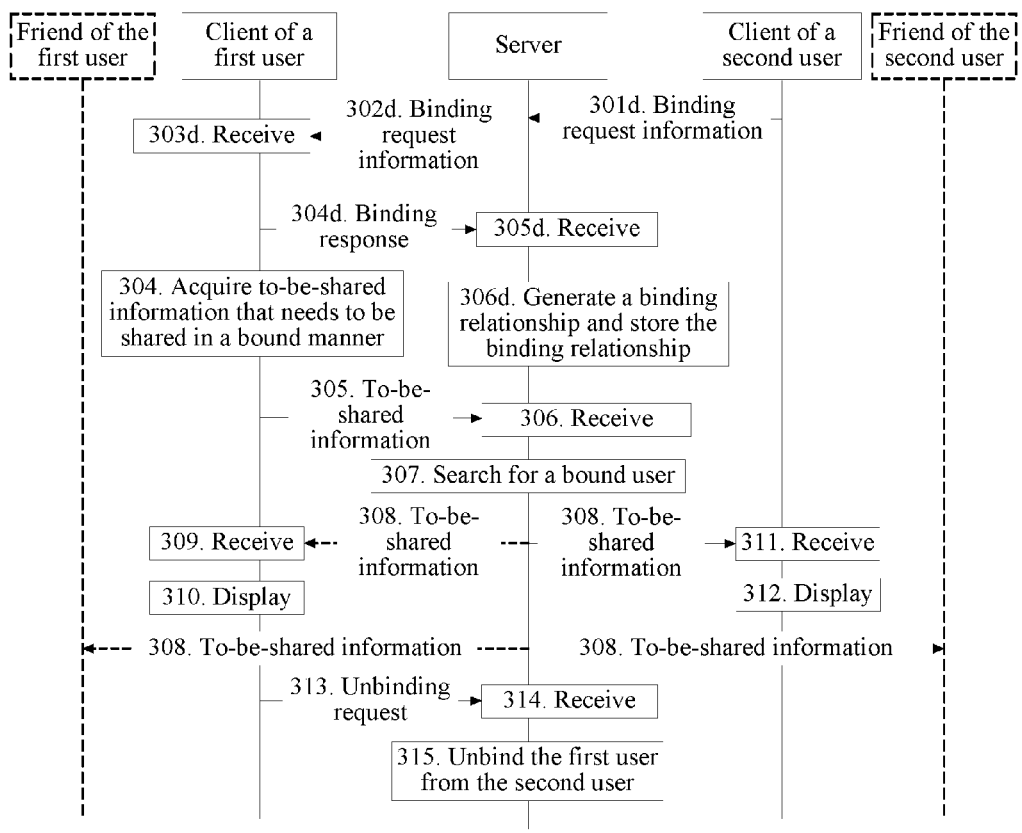
FIG. 11 is a method flowchart of an information sharing method according to yet some other embodiment of the present application.

FIG. 11 is a method flowchart of an information sharing method according to yet another embodiment of the present application. The method my include steps discussed below.

At step 301d, a computer client of a second user sends a binding request to a first user via the computer server.

At step 302d, the server forwards the binding request to the first user.

At step 303d, the computer client of the first user receives the binding request from the second user via the server.

At step 304d, the computer client of the first user sends a binding response to the server.

At step 305d, the server receives the binding response from the first user.

At step 306d, if the first user agrees to be bound with the second user, the computer server may generate the binding relationship between the first user and the second user, and store the binding relationship.

Steps 304 through 315 are similar to the corresponding steps shown in FIG. 3.

According to the present embodiment, a binding relationship between a first user and a second user is generated if the first user agrees to be bound with the second user.

Figure 12:
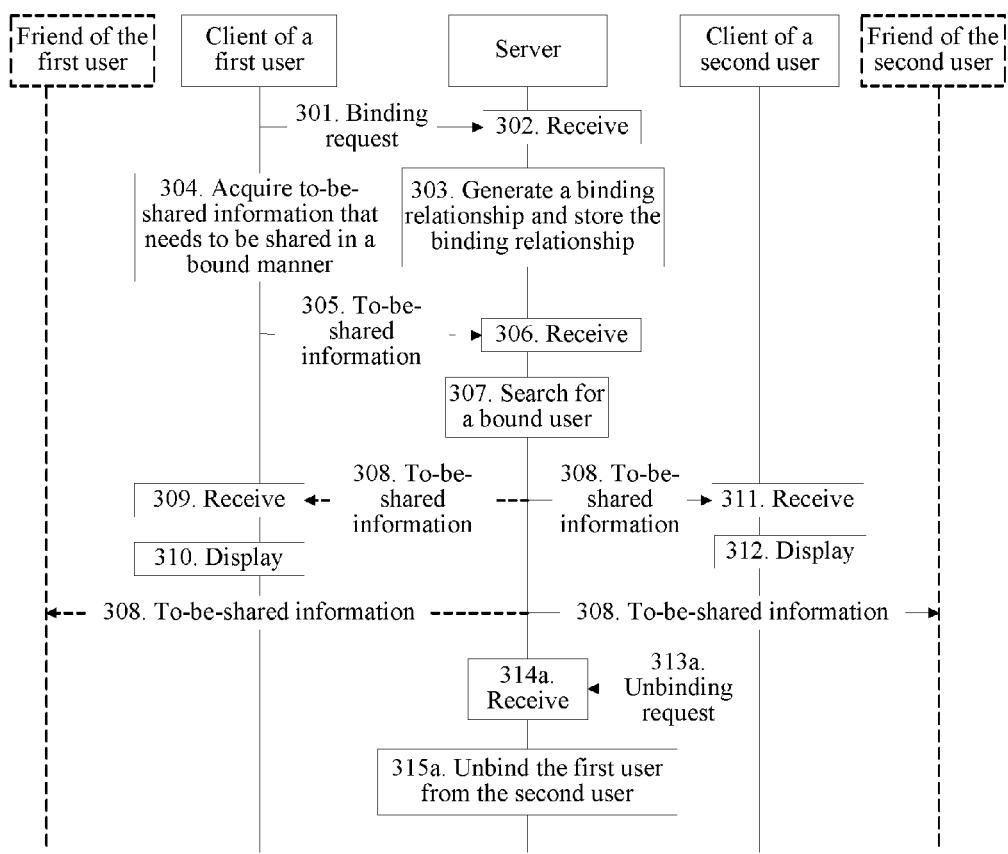
FIG. 12 is a method flowchart of a release process in an information sharing method according to some embodiment of the present application.

FIG. 12 is a method flowchart of a release process in an information sharing method according to an embodiment of the present application. The method may include steps discussed below.

Steps 301 through 312 are similar to the corresponding steps shown in FIG. 3.

At step 313a, the client of the second user sends a release request to the first user to release the binding relationship.

At step 314a, the server receives the release request from the second user.

At step 315a, the server releases the binding relationship between the first user and the second user.

Comparing FIG. 3 with FIG. 12, the release request may be initiated by either the first user or the second user.

Figure 13:
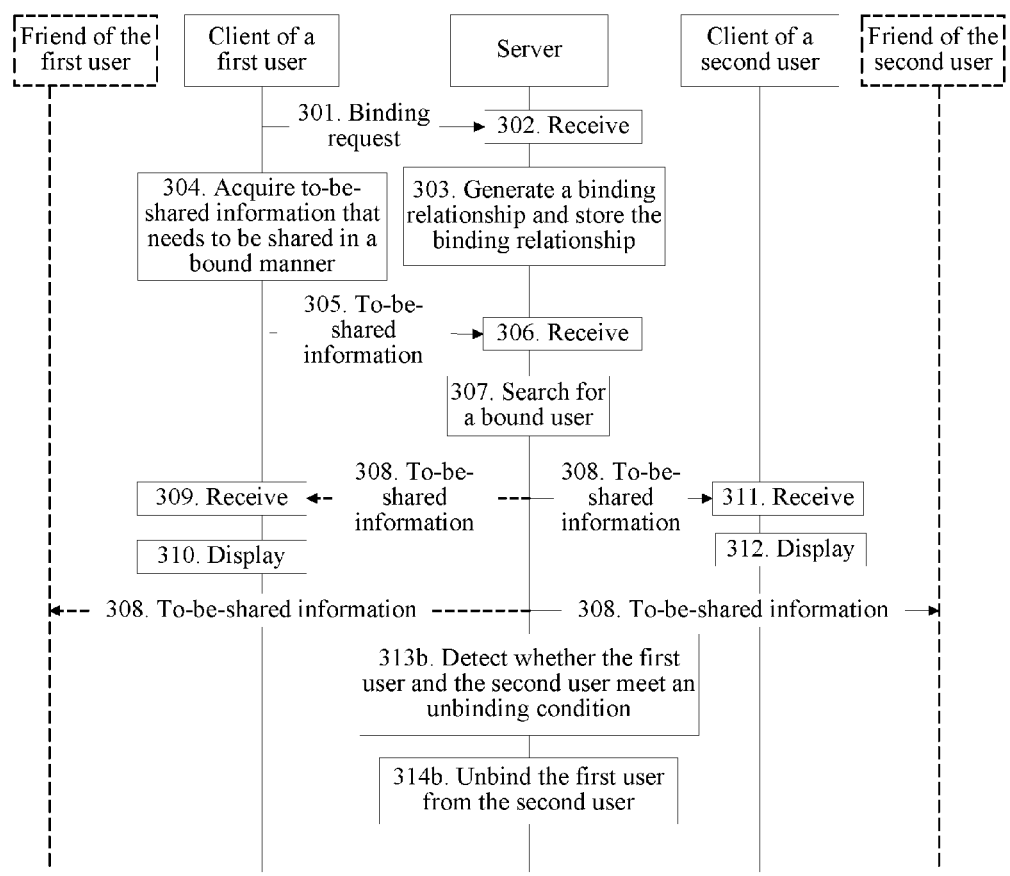
FIG. 13 is a method flowchart of a release process in an information sharing method according to some other embodiment of the present application.

FIG. 13 is a method flowchart of an release process in an information sharing method according to another embodiment of the present application. The method may include steps discussed below.

Steps 301 through 312 are similar to the corresponding steps shown in FIG. 3.

At step 313b, the server determines whether a friendship between the first user and the second user satisfies a release condition.

At step 314b, if a friendship between the first user and the second user meets a release condition, the server releases the binding relationship between the first user and the second user.

In some embodiments, the server may retrieve a friend list of the first user or the second user. If the first user and the second user are no longer friends, the binding relationship between the first user and the second user is released to avoid unnecessary information sharing.

WeChat Moments is used as an illustrative example discussed below.

Table 1 shows friendships among user A, B, and C.

TABLE 1

| User A | User B | User C |
|--------|--------|--------|
| B      | A      | A      |
| C      | B1     | C1     |
| A1     | B2     | C2     |
| A2     | B3     | C3     |
| A3     | B4     | C4     |

The user A has friends: B, C, A1, A2 and A3; the user B has friends: A, B1, B2, B3 and B4; and the user C has friends: C1, C2, C3 and C4. The user A is bound to friends B and C. The user A sends a binding request to friends B and C through the server, and after the binding succeeds, in addition to forwarding the information to friends A1, A2 and A3 of the user A, the user A also forwards the information to friends B1, B2, B3 and B4 of the user B through the server because the user A is bound to the users B and C. Similarly, this also applies to the friend C. After the user A sends the information, display interfaces of the user A, the friend B, and friends of the friend B are shown in FIG. 7a, FIG. 7b and FIG. 7c, respectively. An attribute of the information shared by the user A is marked as "already forwarded in a binding manner" on the display interface of the user A (FIG. 7a). Because of the binding relationship, after the user A sends the information, the friend B automatically forwards the information, and on the display interface of the friend B (FIG. 7b), the information shared by the user A is marked as "forwarded by the user A," and an attribute of the information shared by the user B in a binding manner is marked as "forwarded by a friend in a binding manner;" and on display interfaces (FIG. 7c) of the friends B1, B2, B3 and B4 of the user B, the information shared by the friend B is marked as "forwarded by a friend in a binding manner," to remind friends of the user B that the information is automatically forwarded according to the binding relationship, but is not forwarded by the friend B voluntarily.

According to the present application, binding and release of a relationship between two users can be initiated by either users and in various manners. Therefore, the information sharing method according to the present application is flexible to users and can be applied to various scenarios.

Figure 14:
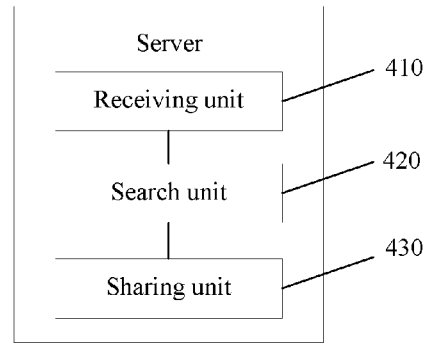
FIG. 14 is a schematic structural diagram of a server according to some embodiment of the present application.

FIG. 14 is a schematic block diagram of a server according to an embodiment of the present application. The server may include a receiving unit 410, a search unit 420, and a sharing unit 430.

The receiving unit 410 may be configured to receive information that needs to be shared in a binding manner and is sent by a first user.

The search unit 420 may be configured to search for at least one second user bound to the first user.

The sharing unit 430 may be configured to share the information received by the receiving unit 410 with a friend of the at least one second user.

Figure 15:
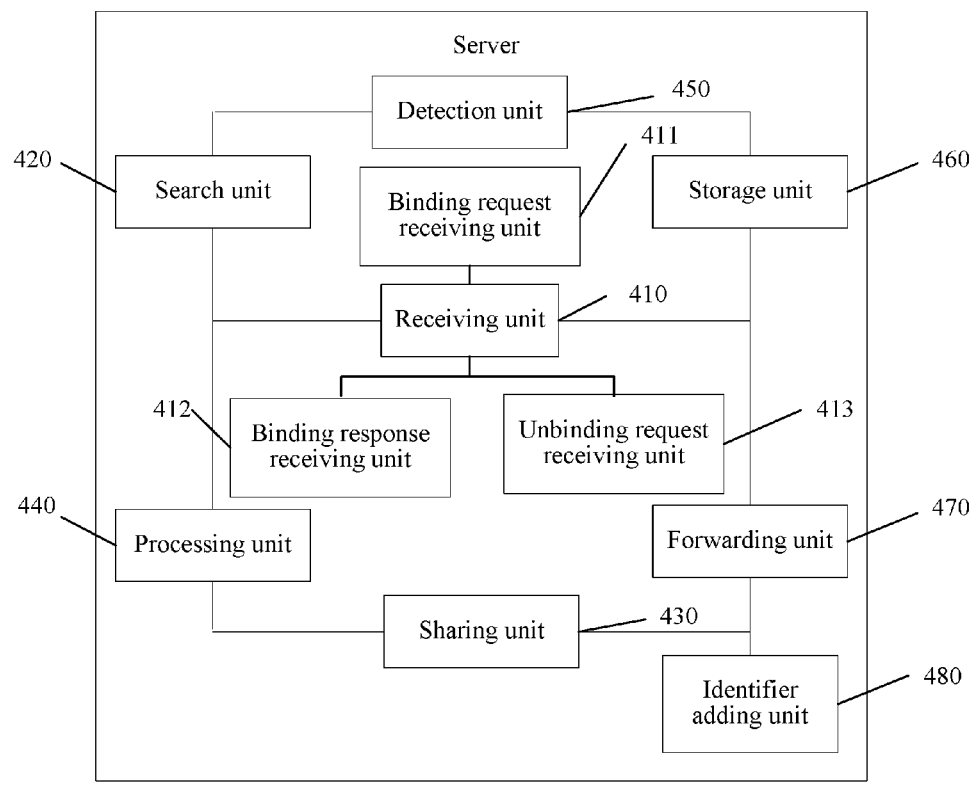
FIG. 15 is a schematic structural diagram of a server according to some other embodiment of the present application.

FIG. 15 is a schematic block diagram of a server according to an embodiment of the present application. The server may include a receiving unit 410, a search unit 420, a sharing unit 430, a binding request receiving unit 411, a binding response receiving unit 412, an release request receiving unit 413, a processing unit 440, a detection unit 450, a storage unit 460, a forwarding unit 470, and an identifier adding unit 480.

The receiving unit 410 may be configured to receive information that needs to be shared in a binding manner and sent by a first user; where the information is original information of the first user; or the information is information forwarded from a predefined information source by the first user.

The search unit 420 may be configured to search for at least one second user bound to the first user.

The sharing unit 430 may be configured to share the information received by the receiving unit 410 with a friend of the first user and a friend of the at least one second user.

In some embodiments, the binding request receiving unit 411 may be configured to receive a binding request used for binding to the second user sent by the first user before the information is received.

The processing unit 440 may be configured to generate a binding relationship between the first user and the second user, and store the binding relationship by using the storage unit 460.

In some embodiments, the binding request receiving unit 411 may be configured to receive a binding request used for binding to the first user sent by the second user.

In some embodiments, the processing unit 440 may be configured to generate a binding relationship between the first user and the second user, and store the binding relationship by using the storage unit 460.

In some embodiments, the detection unit 450 may be configured to detect whether a friendship between the first user and the second user meets a binding condition.

In some embodiments, the processing unit 440 may be configured to generate a binding relationship between the first user and the second user, and store the binding relationship by using the storage unit 460 if the friendship between the first user and the second user meets the binding condition.

In some embodiments, after the binding request receiving unit 411 receives the binding request used for binding to the first user sent by the second user, the forwarding unit 470 may be configured to forward the binding request to the first user.

In some embodiments, the binding response receiving unit 412 may be configured to receive a binding response fed back by the first user.

In some embodiments, the processing unit 440 is further configured to generate a binding relationship between the first user and the second user and storing the binding relationship by using the storage unit 460 if the binding response indicates that the binding is approved.

Further in some embodiments, after the processing unit 440 generates a binding relationship between the first user and the second user and stores the binding relationship, the release request receiving unit 413 may be configured to receive an release request used for release from the second user sent by the first user; and the processing unit 440 is further configured to release the binding relationship between the first user and the second user.

In some embodiments, the release request receiving unit 413 may be configured to receive a release request used for release from the first user and sent by the second user; and the processing unit 440 is further configured to release the binding relationship between the first user and the second user.

In some embodiments, the detection unit 450 is further configured to detect whether a friendship between the first user and the second user meets an release condition; and the processing unit 440 is further configured to, if a result of the detection is that the friendship meets the release condition, release the binding relationship between the first user and the second user.

In some embodiments, the sharing unit 430 may be configured to share information carrying a specific identifier with a friend of the first user and a friend of the at least one second user.

Figure 16:
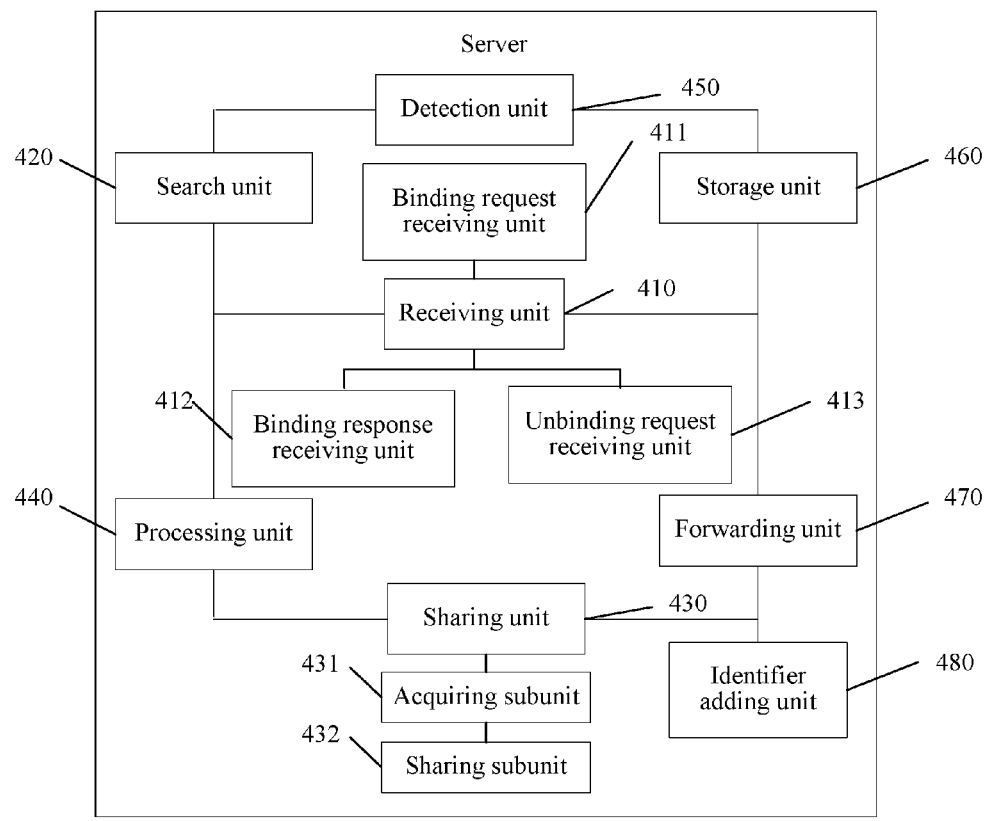
FIG. 16 is a schematic structural diagram of a server according to some other embodiment of the present application.

FIG. 16 is a schematic structural diagram of a server according to another embodiment of the present application. According to the present embodiment, elements 410 through 480 are similar to FIG. 15, and the sharing unit 430 may further include an acquiring subunit 431, configured to acquire a friend list of at least one second user; and a sharing subunit 432, configured to share, according to the friend list of the second user acquired by the acquiring subunit, the information with a friend of the at least one second user.

In some embodiments, the acquiring subunit 431 may be configured to acquire a friend list of the first user; and the sharing subunit 432 may be configured to share, according to the friend list of the first user acquired by the acquiring subunit, the information with a friend of the first user, where the at least one second user is a friend of the first user.

In some embodiments, the identifier adding unit 480 may be configured to add a specific identifier to the received information, where the specific identifier is used to indicate that the information is shared in a binding-sharing manner, and the specific identifier is used to trigger, when the information is displayed, differentiated display of the binding-sharing information and the general sharing information.

Figure 17:
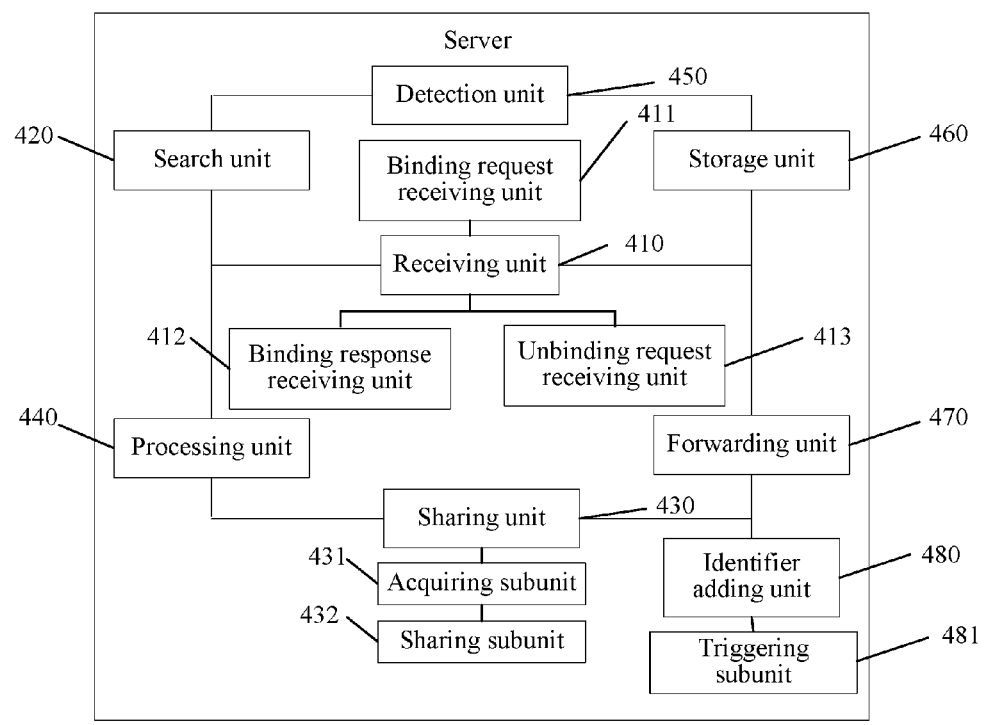
FIG. 17 is a schematic structural diagram of a server according to yet some other embodiment of the present application.

FIG. 17 is a schematic structural diagram of a server according to yet another embodiment of the present application. The identifier adding unit 480 may further include a triggering subunit 481. When the information is shared with the first user, the triggering subunit 481 may trigger an attribute of the information to be displayed on a display interface of the first user. The attribute may be as specific identifier, such as "already forwarded to at least one second user."

In some embodiments, when the information is shared with the second user, the triggering subunit 481 may trigger an attribute of the information to be displayed on a display interface of the second user using a specific identifier, such as "forwarded by the first user."

In some embodiments, when information is shared with a friend of the second user, a triggering subunit 481 may trigger an attribute of the information to be displayed on a display interface of the friend of the second user, by using the specific identifier, such as "forwarded by the second user in a bound sharing manner."

Figure 18:
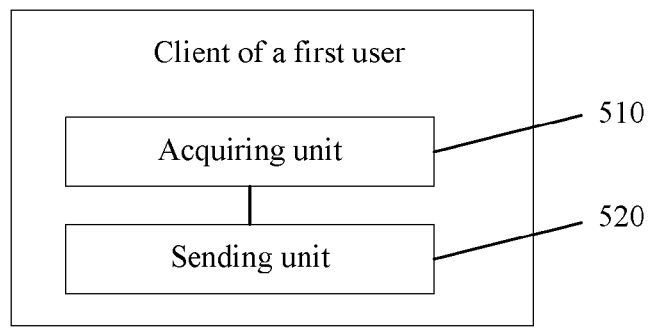
FIG. 18 is a schematic structural diagram of a client of a first user according to some embodiment of the present application.

FIG. 18 is a schematic block diagram of a client of a first user according to an embodiment of the present application. The client may include an acquiring unit 510 and a sending unit 520.

The acquiring unit 510 may be configured to acquire information that needs to be shared in a binding manner.

The sending unit 520 may be configured to send the information acquired by the acquiring unit 510 to a server; so that the server receives the information that needs to be shared in a binding manner and is sent by the first user, searches for at least one second user bound to the first user, and shares the information with a friend of the at least one second user.

Figure 19:
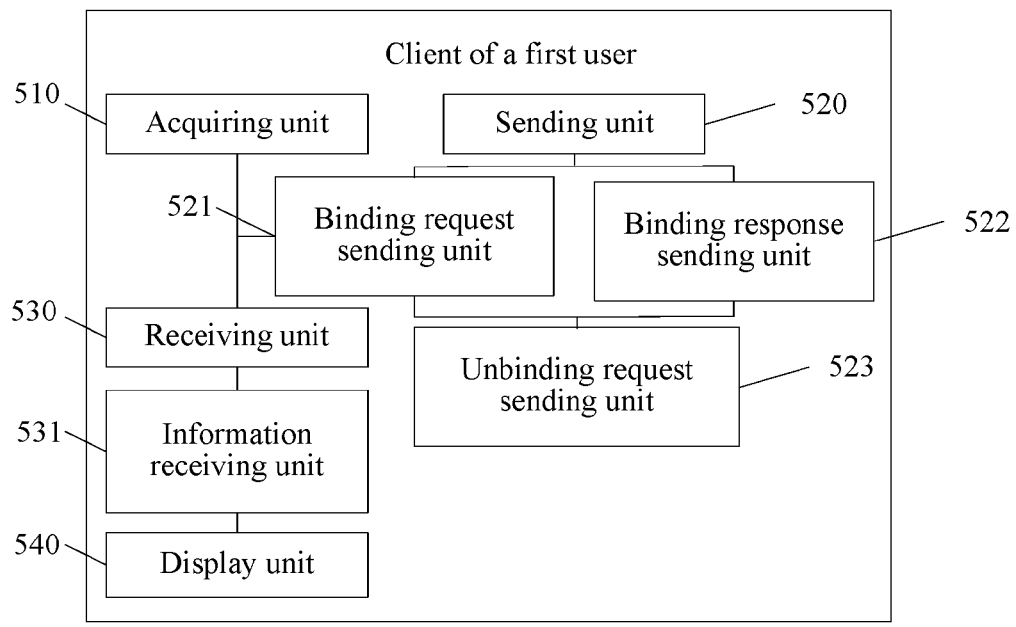
FIG. 19 is a schematic structural diagram of a client of a first user according to another embodiment of the present application.

FIG. 19 is a schematic block diagram of a client of a first user according to an embodiment of the present application. The client of the first user may include an acquiring unit 510, a sending unit 520, a binding request sending unit 521, a binding response sending unit 522, a release request sending unit 523, a receiving unit 530, an information receiving unit 531, and a display unit 540.

The acquiring unit 510 may be configured to acquire information that needs to be shared in a binding manner.

The sending unit 520 may be configured to send the information acquired by the acquiring unit 510 to a server, so that the server receives the information that needs to be shared in a binding manner and is sent by the first user, searches for at least one second user bound to the first user, and shares the information with a friend of the at least one second user.

In some embodiments, the sending unit 520 may further include the binding request sending unit 521, which may configured to send a binding request used for binding to the second user to the server, so that the server receives the binding request, generates a binding relationship between the first user and the second user, and stores the binding relationship.

In some embodiments, the client may further include the receiving unit 530, configured to receive a binding request from the second user and forwarded by the server, where the binding request is a request used for requesting binding to the first user and sent by the second user. The binding response sending unit 522 may be configured to feed back a binding response to the server, where the binding response is used to trigger the server to generate and store a binding relationship between the first user and the second user when the binding response indicates that the binding is approved.

In some embodiments, the binding response sending unit 522 may further include the release request sending unit 523 that is configured to send a release request used for release from the second user to the server, so that the server receives the release request, and releases the binding relationship between the first user and the second user.

In some embodiments, the acquiring unit 510 may be further configured to acquire original information of the first user, and generate information based on the original information.

In some embodiments, the acquiring unit 510 may be further configured to acquire information forwarded from a predefined information source by the first user, and generate information based on the information.

The client may further include the information receiving unit 531, configured to receive the information shared by the server after the information is sent to the server. The information may carry a specific identifier used to indicate that the information is shared in a bound sharing manner.

The display unit 540 may display, in differentiated manners, the binding-sharing information and the general sharing information.

Figure 20:
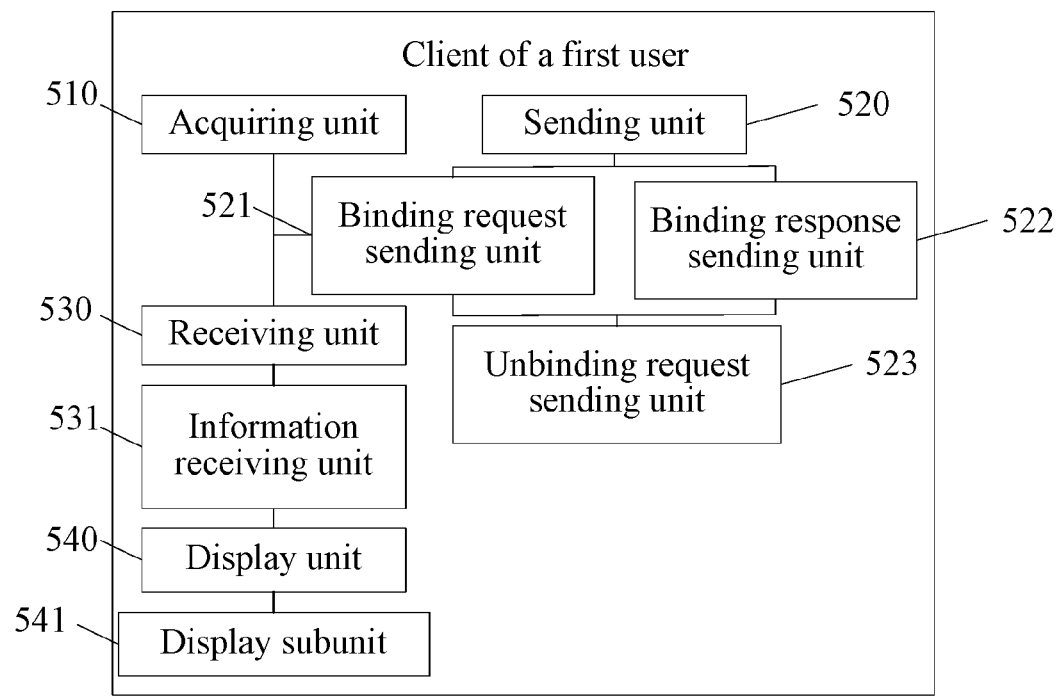
FIG. 20 is a schematic structural diagram of a client of a first user according to some other embodiment of the present application.

FIG. 20 is a schematic structural diagram of a client of a first user according to another embodiment of the present application. According to the present embodiment, the display unit 540 may include a display subunit 541, configured to trigger, according to the specific identifier in the information, display of the information shared in a bound sharing manner, and mark an attribute of the information, such as "already forwarded to at least one second user."

Figure 21:
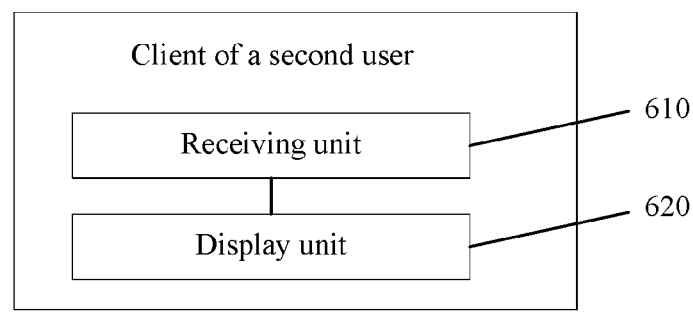
FIG. 21 is a schematic structural diagram of a client of a second user according to some other embodiment of the present application.

FIG. 21 is a schematic block diagram of a client of a second user according to an embodiment of the present application. The client may include a receiving unit 610 and a display unit 620.

The receiving unit 610 may be configured to receive information that is sent by a server in a binding sharing manner, where the information is information that needs to be shared in a binding manner and is sent by the first user and received by the server, and shared with a friend of at least one second user after the at least one second user bound to the first user is found.

The display unit 620 may be configured to display the information received by the receiving unit 610.

Figure 22:
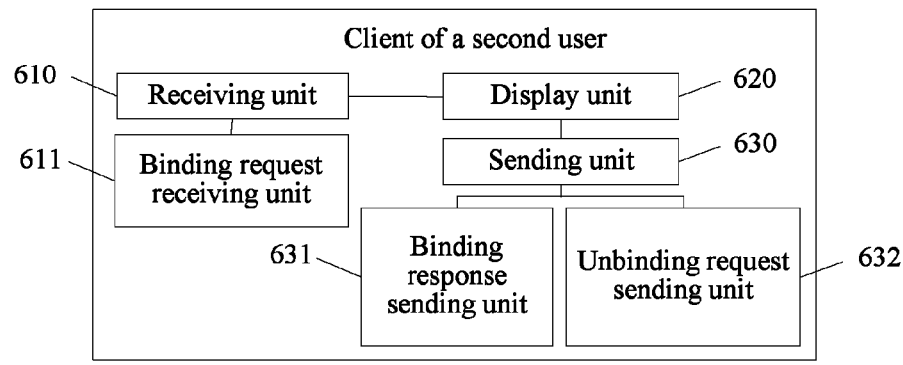
FIG. 22 is a schematic structural diagram of a client of a second user according to some other embodiment of the present application.

FIG. 22 is a schematic block diagram of a client of a second user according to an embodiment of the present application. The client may include a receiving unit 610, a binding request receiving unit 611, a display unit 620, a sending unit 630, a binding response sending unit 631, and a release request sending unit 632.

The receiving unit 610 may be configured to receive information that is sent by a server in a binding sharing manner, where the information needs to be shared in a binding manner, sent by a first user, received by the server, and shared with a friend of the first user and a friend of at least one second user after the at least one second user bound to the first user is found. The information is original information of the first user; or the information is information forwarded from a predefined information source by the first user.

The display unit 620 may be configured to display the information received by the receiving unit 610.

In some embodiments, the sending unit 630 may be configured to: before the information sent by the server in the bound sharing manner is received, send to the server a binding request used for binding to the first user, so that the server receives the binding request, generates a binding relationship between the first user and the second user, and stores the binding relationship.

In some embodiments, the client may further include the binding request receiving unit 611. Before the information sent by the server in the bound sharing manner is received, the binding request receiving unit 611 may receive a binding request from the first user and forwarded by the server, where the binding request is a request used for requesting binding to the second user and sent by the first user.

In some embodiments, the binding response sending unit 631 may be configured to feed back a binding response to the server, where the binding response is used to trigger the server to generate and store a binding relationship between the first user and the second user when the binding response indicates that the binding is approved.

The sending unit 630 may further include the release request sending unit 632, configured to send to the server a release request used for release from the first user, so that the server receives the release request, and releases the binding relationship between the first user and the second user.

In some embodiments, the receiving unit 610 may be configured to receive the information shared by the server, where the information carries a specific identifier used to indicate that the information is shared in the bound sharing manner.

In some embodiments, the display unit 620 is further configured to display, in differentiated manners, the information and other information that is shared in a common sharing manner.

Figure 23:
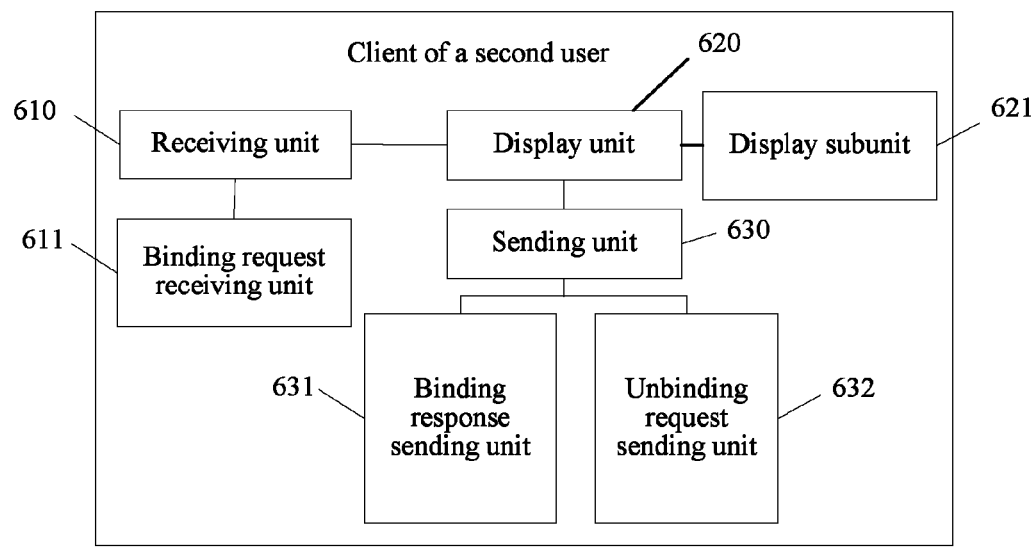
FIG. 23 is a schematic structural diagram of a client of a second user according to some other embodiment of the present application.

According to FIG. 23, the display unit 620 may include a display subunit 621, configured to trigger, according to the specific identifier in the information, display of the information shared in a bound sharing manner, and mark an attribute of the information, such as "forwarded by the first user."

Figure 24:
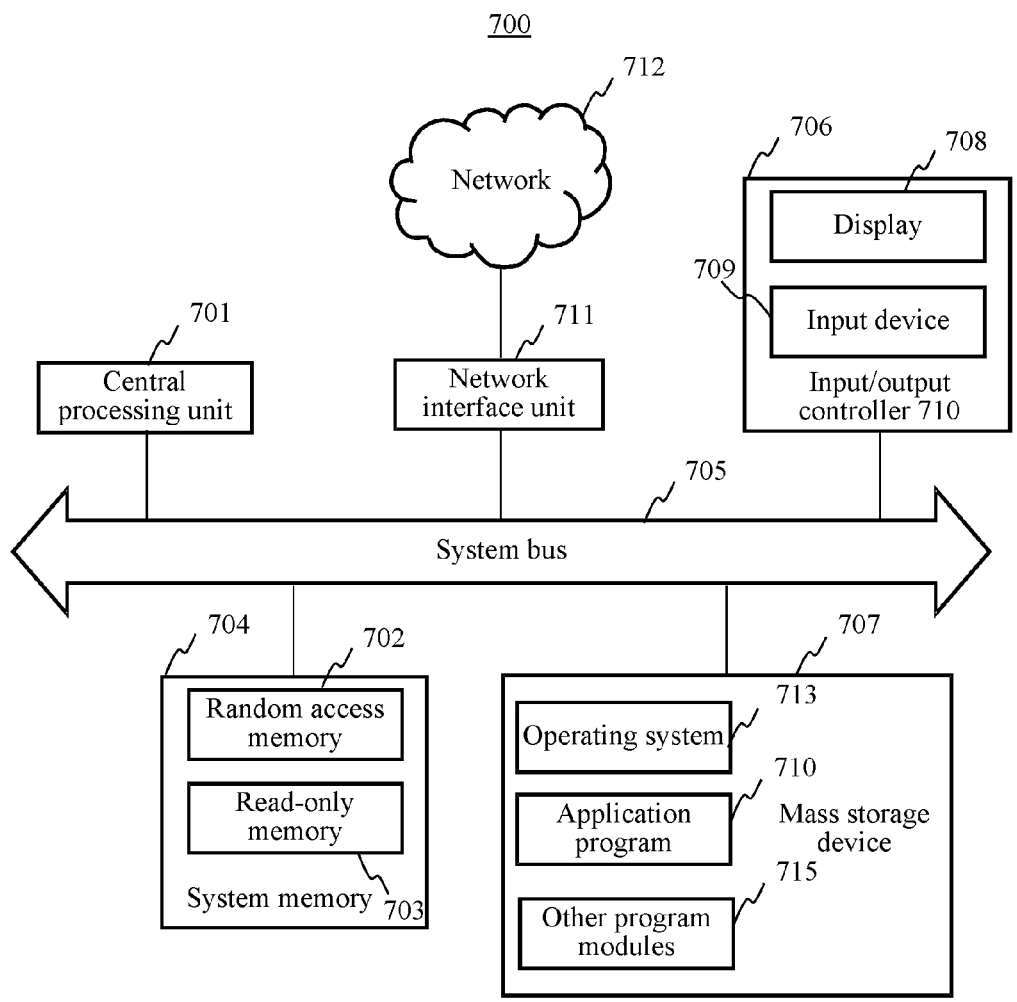
FIG. 24 is a schematic structural diagram of a server according to some other embodiment of the present application.

FIG. 24 is a schematic structural diagram of a server according to an embodiment of the present application. The server 700 may include a central processing unit (CPU) 701, a system memory 704 that includes a random access memory (RAM) 702 and a read-only memory (ROM) 703, and a system bus 705 that connects the system memory 704 and the central processing unit 701. The server 700 further includes a basic input/output system (I/O system) 706 that assists information transmission between devices within a computer, and a mass storage device 707 that may be configured to store an operating system 713, an application program 710, and another program module 715.

The basic I/O system 706 includes a display 708 configured to display information, and an input device(s) 709, such as a mouse and/or a keyboard, with which a user enters information. Herein, the display 708 and the input device 709 are connected to the central processing unit 701 by using an input-output controller 710 that is connected to the system bus 705. The basic I/O system 706 may further include the input-output controller 710, configured to receive and process input from multiple other devices, such as a keyboard, a mouse, and/or an electronic stylus. Similarly, the input-output controller 710 further provides output to the display, a printer, and/or an output device of another type.

The mass storage device 707 is connected to the central processing unit 701 by using a mass storage controller (not shown) that is connected to the system bus 705. The mass storage device 707 and an associated computer readable medium provide a non-volatile memory for the server 700. In other words, the mass storage device 707 may include a computer readable medium (not shown), such as a hard disk, or a CD-ROM drive.

Generally, the computer readable medium may include a computer storage medium and a communications medium. The computer storage medium includes any volatile or non-volatile, removable or solid-state medium that is used to store information, such as a computer readable instruction, a data structure, a program module, or other data, and can be implemented by any method or technology. The computer storage medium includes a RAM, a ROM, an EPROM, an EEPROM, a flash memory or other solid-state storage means, a CD-ROM, a DVD or other optical memories, a cassette case, a cassette, a disk memory, or other magnetic storage devices. Certainly, one skilled in the art can know that the computer storage medium is not limited to the foregoing ones. The foregoing system memory 704 and the mass storage device 707 may be collectively referred to as the memory.

According to the embodiments of the present application, the server 700 may further be connected to a remote computer on a network through a network such as the Internet and run on the remote computer. That is, the server 700 may be connected to a network 712 by using a network interface unit 711 that is connected to the system bus 705, or in other words, may be connected to a network of another type or a remote computer system (not shown) by using the network interface unit 711.

The memory further includes one or more programs, where the one or more programs are stored in the memory.

Figure 25:
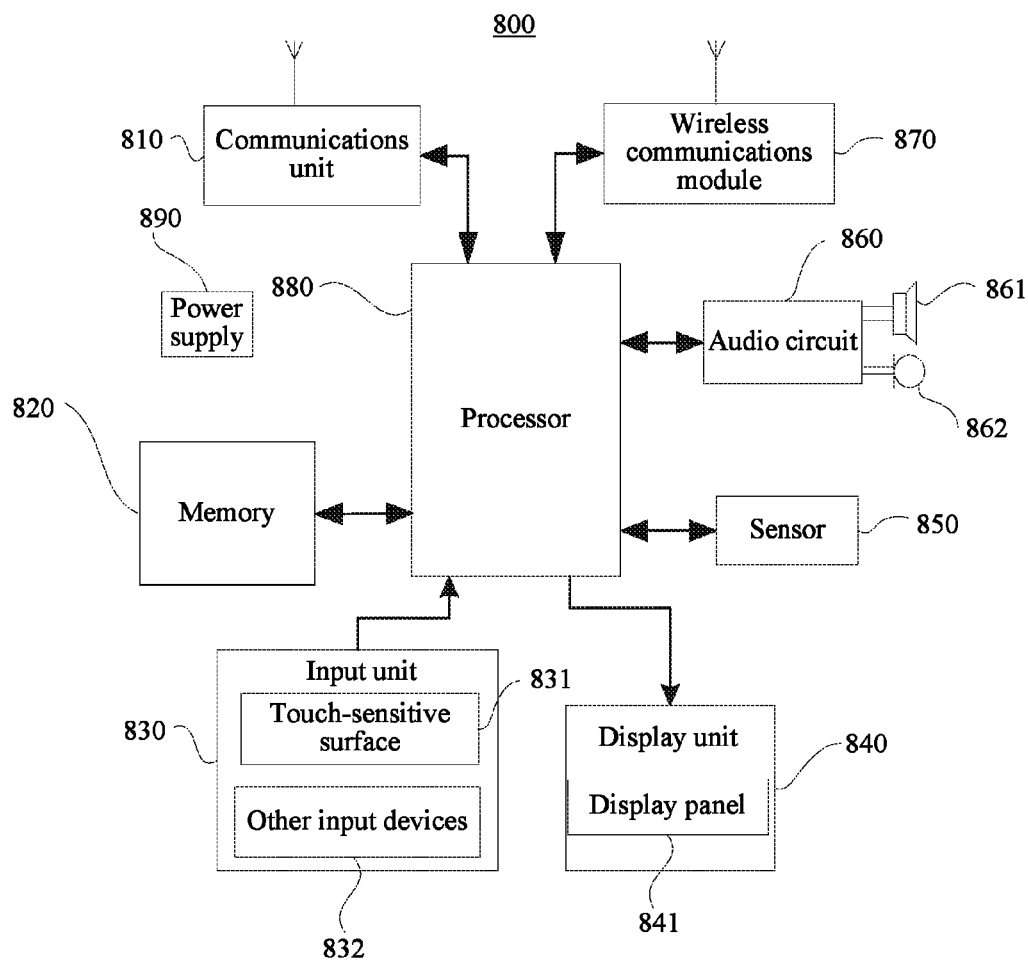
FIG. 25 is a schematic structural diagram of a client according to some other embodiment of the present application.

FIG. 25 is a schematic block diagram of a client according to an embodiment of the present application. The client 800 may include devices such as a communications unit 810, a memory 820 that includes one or more computer readable storage mediums, an input unit 830, a display unit 840, a sensor 850, an audio circuit 860, a Wireless Fidelity (WIFI) module 870, a processor 880 that includes one or more processing cores, and a power supply 890. One skilled in the art can understand that a terminal structure shown in FIG. 25 is not intended to limit the client, and the terminal may include more or less components than those shown in the figure, or combine some components, or have a different component arrangement.

The communications unit 810 may be configured to receive and send a signal in an information sending and receiving process or during a call, where the communications unit 810 may be a network communications device such as a radio frequency (RF) circuit, a router, or a modem. Particularly, when the communications unit 810 is an RF circuit, after receiving downlink information of a base station, the communications unit 810 delivers the downlink information to one or more processors 880 for processing, and moreover, sends related uplink data to the base station. Generally, as a communications unit, the RF circuit includes but is not limited to an antenna, at least one amplifier, a tuner, one or more oscillators, a subscriber identity module (SIM) card, a transceiver, a coupler, a low noise amplifier (LNA), a duplexer, or the like. In addition, the communications unit 810 may further communicate with the network or another device by means of wireless communication. The wireless communication may use any communications standard or protocol, including but not limited to Global System of Mobile communication (GSM), General Packet Radio Service (GPRS), Code Division Multiple Access (CDMA), Wideband Code Division Multiple Access (WCDMA), Long Term Evolution (LTE), an email, a short messaging service (SMS), or the like. The memory 820 may be configured to store a software program and module, and the processor 880 performs multiple functions and processes data by running the software program and module stored in the memory 820. The memory 820 may mainly include a program storage area and a data storage area, where the program storage area may store an operating system, and an application program required by at least one function (such as a voice playback function, or an image playback function); and the data storage area may store data (such as audio data, or a phone book) created according to the use of the client 800. Furthermore, the memory 820 may include a high-speed RAM, or a non-volatile memory, such as at least one disk storage device or flash storage device, or other volatile solid-state storage devices. Correspondingly, the memory 820 may further include a memory controller, so that the processor 880 and the input unit 830 can access the memory 820.

The input unit 830 may be configured to receive entered digital or character information, and generate keyboard, mouse, joystick, optical or trackball signal input that is associated with user settings and function control. Preferably, the input unit 830 may include a touch-sensitive surface 831 and another input device 832. The touch-sensitive surface 831, also referred to as a touch screen or a touch pad, may collect a touch operation performed by the user on or near the touch-sensitive surface (for example, an operation performed by the user by using any proper object or accessory like a finger, or a stylus pen on the touch-sensitive surface 831 or near the touch-sensitive surface 831), and drive a corresponding connected apparatus according to a preset program. In some embodiments, the touch-sensitive surface 831 may include two parts: a touch detection apparatus and a touch controller. Herein, the touch detection apparatus detects a touch position of the user, detects a signal generated by a touch operation, and transmits the signal to the touch controller. The touch controller receives touch information from the touch detection apparatus, converts the touch information into touch point coordinates, then sends the touch point coordinates to the processor 880, and can receive and execute a command sent by the processor 880. Furthermore, the touch-sensitive surface 831 may be implemented in different types such as a resistive type, a capacitive type, an infrared type and a surface acoustic wave type. In addition to the input unit 831, the input unit 830 may further include another input device 832. Preferably, another input device 832 may include but is not limited to one or more of a physical keyboard, a function key (such as a volume control button, or a power button), a trackball, a mouse, and a joystick.

The display unit 840 may be configured to display information entered by the user or information provided for the user, and multiple graphical user interfaces of the client 800, where these graphical user interfaces may be formed by graphs, texts, icons, videos, and any combination thereof. The display unit 840 may include a display panel 841, and In some embodiments, the display panel 841 may be configured in a form of a liquid crystal display (LCD), or an organic light-emitting diode (OLED). Further, the touch-sensitive surface 831 may cover the display panel 841. After detecting the touch operation on or near the touch-sensitive surface 831, the touch-sensitive surface 831 delivers the touch operation to the processor 880, so as to determine the type of the touch event. Subsequently, the processor 880 provides corresponding visual output on the display panel 841 according to the type of the touch event. Although in FIG. 25, the touch-sensitive surface 831 and the display panel 841 are used as two independent components to implement the input and output functions, in some embodiments, the touch-sensitive surface 831 and the display panel 841 may be integrated to implement the input and output functions.

The client 800 may further include at least one sensor 850, such as an optical sensor, a motion sensor, or another sensor. The optical sensor may include an ambient light sensor and a proximity sensor, where the ambient light sensor may adjust luminance of the display panel 841 according to ambient illumination, and the proximity sensor may close the display panel 841 and/or backlight when the client 800 moves near an ear. As a kind of motion sensor, a gravity acceleration sensor may detect acceleration in different directions (generally in three axes). The gravity acceleration sensor may detect a value and direction of the gravity when it is in a stationary state, and may be used in an application that recognizes a mobile phone attitude (such as portrait-landscape screen switching, a related game, or magnetometer attitude calibration), a function associated with vibration recognition (such as a pedometer, knocking), or the like. Other sensors such as a gyroscope, a barometer, a hygrometer, a thermometer, and an infrared sensor that may further be configured for the client 800 are not described herein.

The audio circuit 860, a loudspeaker 861, and a microphone 862 may provide an audio interface between the user and the client 800. The audio circuit 860 may transmit, to the loudspeaker 861, a received electrical signal converted from audio data, and the loudspeaker 861 converts the electrical signal into an audio signal for output. In addition, the microphone 862 converts a collected audio signal into an electrical signal; the audio circuit 860 receives the electrical signal, converts it into audio data, and outputs the audio data to the processor 880 for processing; the communications unit 810 sends the audio data to, for example, another terminal, or outputs the audio data to the memory 820 for further processing. The audio circuit 860 may further include an earphone jack, so as to provide communication between a peripheral earphone and the client 800.

In order to implement wireless communication, the terminal may be configured with a wireless communications unit 870, where the wireless communications unit 870 may be a WIFI module. WIFI is a short-distance wireless transmission technology. By using the wireless communications unit 870, the client 800 can help the user receive and send an email, browse a webpage, access streaming media, and the like. The WIFI provides the user with wireless broadband Internet access. Although the wireless communications unit 870 is shown in the figure, it may be understandable that the wireless communications unit 870 is not a mandatory component of the client 800, and absolutely may be omitted as required without changing the scope of the essence of the present application.

As a control center of the client 800, the processor 880 connects all parts of a mobile phone by using various interfaces and circuits, and performs various functions of the client 800 and processes data by running or performing a software program and/or module in the memory 820 and invoking data stored in the memory 820, so as to perform overall monitoring on the mobile phone. In some embodiments, the processor 880 may include one or more processing cores. Preferably, the processor 880 may integrate an application processor and a modulation-demodulation processor, where the application processor mainly processes the operating system, a user interface and the application program, and the modulation-demodulation processor mainly processes wireless communication. It is understandable that the modulation-demodulation processor may also not be integrated in the processor 880.

The client 800 further includes the power supply 890 (such as a battery) that supplies power to the components. Preferably, the power supply may be logically connected to the processor 880 by using a power management system, so as to implement functions such as charging, discharging, power consumption management, and the like by using the power management system. The power supply 890 may further include any component such as one or more direct current or alternating current power supplies, a rechargeable system, a power supply fault detection circuit, a power converter or inverter, or a power status indicator.

Although not shown, the client 800 may further include a camera, a Bluetooth module, or the like, which is not described herein in detail.

In this embodiment, the terminal further includes one or more programs, where the one or more programs are stored in the memory, and configured to be performed by one or more processors. The one or more programs include an instruction used for implementing the information sharing method provided by the embodiment of the present application. Structures of the client of the first user and the client of the second user provided by the embodiments of the present application are the same as that of the foregoing client.

Figure 26:
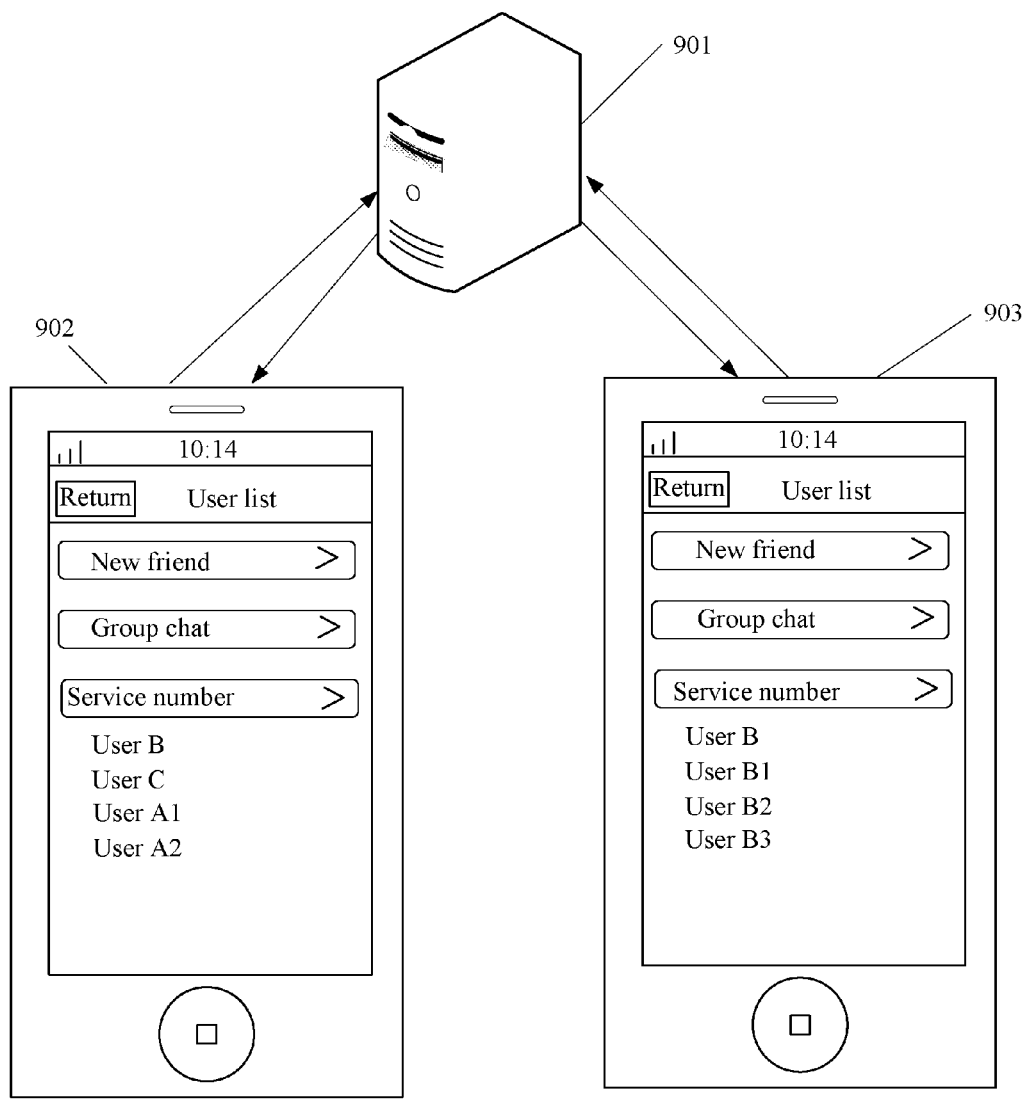
FIG. 26 is a schematic structural diagram of a communication system according to some embodiment of the present application.

FIG. 26 is a schematic block diagram of a communications system according to an embodiment of the present application. The communications system includes: a server 901, and a client 902 of a first user and a client 903 of at least one second user that are controlled by the server 901, where the server 901 is separately connected to the client 902 of the first user and the client 903 of the at least one second user, where the server 901 is the server shown in any one of FIG. 14 to FIG. 17; the client 902 of the first user is the client of the first user shown in any one of FIG. 18 to FIG. 20; and the client 903 of the second user is the client of the second user shown in any one of FIG. 21 to FIG. 23; or the server 901 is the server shown in FIG. 24; and the client 902 of the first user and the client 903 of the second user are both the client shown in FIG. 25.

The sequence numbers in the foregoing embodiments of the present application are merely used for description but do not indicate the merits of the embodiments.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of sharing information in a social networking application comprising:
   at a computer server having one or more processors and memory storing programs configured for execution by the one or more processors,
   receiving a binding request from a first user to bind with at least a second user of a social networking application, the second user being on a friend list of the first user;
   generating a binding relationship between the first user and the second user;
   storing the binding relationship between the first user and the second user at the computer server;
   receiving information from the first user to be shared in a binding manner with the second user;
   retrieving a friend list of the second user;
   sharing the information from the first user with at least one friend on the friend list of the second user; and
   adding an identifier to the information from the first user to be shared in the binding manner, wherein
   when the information from the first user is shared with at least one friend of the second user, the identifier is configured to display:
      a first tag on an interface of the first user, indicating that the information has been shared with friends;
      a second tag on an interface of the second user, indicating that the information is shared by a friend, and
      a third tag on an interface of the at least one friend of the second user, indicating that the information is shared by a friend in the binding manner.

2. The method of sharing information in a social networking application of claim 1, wherein the step of generating a binding relationship between the first user and the second user further comprises:
   forwarding the binding request to the second user;
   receiving a binding response from the second user;
   determining from the binding response whether the second user agrees to be bound with the first user; and
   if the second user agrees to be bound with the first user, generating the binding relationship between the first user and the second user.

3. The method of sharing information in a social networking application of claim 2, further comprises:
   receiving a release request from the first user to release the binding relationship from the second user; and
   releasing the binding relationship between the first user and the second user.

4. The method of sharing information in a social networking application of claim 3, further comprises:
   determining whether a friendship between the first user and the second user satisfies a release condition; and
   if the friendship between the first user and the second user satisfies the release condition, releasing the binding relationship between the first user and the second user.

5. The method of sharing information in a social networking application of claim 1, wherein the step of generating a binding relationship between the first user and the second user further comprises:
   determining whether a friendship between the first user and the second user satisfies a binding condition; and
   if the friendship between the first user and the second user satisfies the binding condition, generating a binding relationship between the first user and the second user.

6. The method of sharing information in a social networking application of claim 1, wherein
   the information from the first user to be shared in the binding manner is originally published by the first user.

7. The method of sharing information in a social networking application of claim 1, wherein
   the information from the first user to be shared in the binding manner is forwarded from a preset information source.

8. A system of sharing information in a social networking application, comprising:
   one or more processors;
   memory; and
   one or more programs stored in the memory and configured for execution by the one or more processors of a computer server, the one or more programs including instructions for:
      receiving a binding request from a first user to bind with at least a second user of a social networking application, the second user being on a friend list of the first user;
      generating a binding relationship between the first user and the second user;
      storing the binding relationship between the first user and the second user at the computer server;
      receiving information from the first user to be shared in a binding manner with the second user;
      retrieving a friend list of the second user;
      sharing the information from the first user with at least one friend on the friend of the second user; and
      adding an identifier to the information from the first user to be shared in the binding manner, wherein
      when the information from the first user is shared with at least one friend of the second user, the identifier is configured to display:
         a first tag on an interface of the first user, indicating that the information has been shared with friends;
         a second tag on an interface of the second user, indicating that the information is shared by a friend, and
         a third tag on an interface of the at least one friend of the second user, indicating that the information is shared by a friend in the binding manner.

9. The system of sharing information in a social networking application of claim 8, wherein the instruction of generating a binding relationship between the first user and the second user further comprises:
   forwarding the binding request to the second user;
   receiving a binding response from the second user;
   determining from the binding response whether the second user agrees to be bound with the first user; and if the second user agrees to be bound with the first user, generating the binding relationship between the first user and the second user.

10. The system of sharing information in a social networking application of claim 9, wherein the one or more programs including instructions further comprises further comprises:
receiving a release request from the first user to release the binding relationship from the second user; and
releasing the binding relationship between the first user and the second user.

11. The system of sharing information in a social networking application of claim 10, wherein the one or more programs including instructions further comprises further comprises:
determining whether a friendship between the first user and the second user satisfies a release condition; and
if the friendship between the first user and the second user satisfies the release condition, releasing the binding relationship between the first user and the second user.

12. The system of sharing information in a social networking application of claim 8, wherein the instruction of generating a binding relationship between the first user and the second user further comprises:
determining whether a friendship between the first user and the second user satisfies a binding condition; and
if the friendship between the first user and the second user satisfies the binding condition, generating a binding relationship between the first user and the second user.

13. The system of sharing information in a social networking application of claim 8, wherein
the information from the first user to be shared in the binding manner is originally published by the first user.

14. The system of sharing information in a social networking application of claim 8, wherein
the information from the first user to be shared in the binding manner is forwarded from a preset information source.

15. A non-transitory computer readable storage medium of a system of sharing information in a social networking application, storing one or more programs for execution by one or more processors of a computer server including instructions for:
receiving a binding request from a first user to bind with at least a second user of a social networking application, the second user being on a friend list of the first user;
generating a binding relationship between the first user and the second user;
storing the binding relationship between the first user and the second user at the computer server;
receiving information from the first user to be shared in a binding manner with the second user;
retrieving a friend list of the second user;
sharing the information from the first user with at least one friend on the friend list of the second user; and
adding an identifier to the information from the first user to be shared in the binding manner, wherein
when the information from the first user is shared with at least one friend of the second user, the identifier is configured to display:
a first tag on an interface of the first user, indicating that the information has been shared with friends;
a second tag on an interface of the second user, indicating that the information is shared by a friend, and
a third tag on an interface of the at least one friend of the second user, indicating that the information is shared by a friend in the binding manner.

16. The non-transitory computer readable storage medium of a system of sharing information in a social networking application of claim 15, wherein the instruction of generating a binding relationship between the first user and the second user further comprises:
forwarding the binding request to the second user;
receiving a binding response from the second user;
determining from the binding response whether the second user agrees to be bound with the first user; and
if the second user agrees to be bound with the first user, generating the binding relationship between the first user and the second user.

17. The non-transitory computer readable storage medium of a system of sharing information in a social networking application of claim 16, wherein the one or more programs including instructions further comprises further comprises:
receiving a release request from the first user to release the binding relationship from the second user; and
releasing the binding relationship between the first user and the second user.

18. The non-transitory computer readable storage medium of a system of sharing information in a social networking application of claim 15, wherein the instruction of generating a binding relationship between the first user and the second user further comprises:
determining whether a friendship between the first user and the second user satisfies a binding condition; and
if the friendship between the first user and the second user satisfies the binding condition, generating a binding relationship between the first user and the second user.

* * * * *